US012154489B2

(12) United States Patent
Kim et al.

(10) Patent No.: US 12,154,489 B2
(45) Date of Patent: *Nov. 26, 2024

(54) DISPLAY DEVICE

(71) Applicant: Samsung Display Co., Ltd., Yongin-si (KR)

(72) Inventors: Taehoon Kim, Hwaseong-si (KR); Sangan Kwon, Cheonan-si (KR); Soon-Dong Kim, Osan-si (KR); Hui Nam, Suwon-si (KR); Eun Sil Yun, Hwaseong-si (KR); Changnoh Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,477

(22) Filed: Aug. 16, 2023

(65) Prior Publication Data

US 2023/0395017 A1 Dec. 7, 2023

Related U.S. Application Data

(63) Continuation of application No. 17/982,889, filed on Nov. 8, 2022, now Pat. No. 11,854,470.

(30) Foreign Application Priority Data

Dec. 10, 2021 (KR) ........................ 10-2021-0176232

(51) Int. Cl.

*G09G 3/32* (2016.01)
*G09G 3/20* (2006.01)

(52) U.S. Cl.

CPC ............. *G09G 3/32* (2013.01); *G09G 3/2007* (2013.01); *G09G 2300/0819* (2013.01);

(Continued)

(58) Field of Classification Search

CPC .................. G09G 3/32; G09G 3/2007; G09G 2300/0819; G09G 2300/0842;

(Continued)

(56) References Cited

U.S. PATENT DOCUMENTS 11,037,498 B2 6/2021 Seo et al.
11,854,470 B2 * 12/2023 Kim ....................... G09G 3/035

(Continued)

FOREIGN PATENT DOCUMENTS

KR 1020200144632 A 12/2020
KR 1020210077340 A 6/2021

*Primary Examiner* — Andrew Sasinowski

(74) *Attorney, Agent, or Firm* — CANTOR COLBURN LLP

(57) ABSTRACT

A display device includes a display panel, a data driver, a scan driver, and a light emitting driver. The display panel includes a first display area and a second display area. The display panel displays a first image on the first display area and the second display area in a first mode, and displays a second image on the first display area in a second mode. The light emitting driver activates emission control signals applied to the first display area and the second display area in the first mode. The light emitting driver activates emission control signals applied to the second display area during a first partial frame in the second mode, and maintains the emission control signals applied to the second display area in a deactivation state during a plurality of second partial frames in the second mode.

20 Claims, 27 Drawing Sheets

(52) U.S. Cl.
CPC ............... *G09G 2300/0842* (2013.01); *G09G 2310/0267* (2013.01); *G09G 2310/027* (2013.01); *G09G 2310/08* (2013.01); *G09G 2330/021* (2013.01)

(58) Field of Classification Search
CPC ..... G09G 2310/0267; G09G 2310/027; G09G 2310/08; G09G 2330/021
See application file for complete search history.

(56) References Cited

U.S. PATENT DOCUMENTS

| | | | |
|---|---|---|---|
| 2016/0063922 | A1 | 3/2016 | Tsai et al. |
| 2018/0025683 | A1 | 1/2018 | Oh et al. |
| 2018/0053284 | A1 | 2/2018 | Rodriguez et al. |
| 2019/0057643 | A1 | 2/2019 | Bae et al. |
| 2020/0365085 | A1 | 11/2020 | Yang et al. |
| 2020/0403131 | A1 | 12/2020 | Kim et al. |
| 2021/0097912 | A1 | 4/2021 | Seo |
| 2021/0158748 | A1 | 5/2021 | Kawae et al. |

* cited by examiner

DISPLAY DEVICE

This application is a continuation of U.S. patent application Ser. No. 17/982,889, filed on Nov. 8, 2022, which claims priority to Korean Patent Application No. 10-2021-0176232, filed on Dec. 10, 2021, and all the benefits accruing therefrom under 35 U.S.C. § 119, the content of which in its entirety is herein incorporated by reference.

BACKGROUND

1. Field

Embodiments of the disclosure described herein relate to a display device and a driving method thereof, and more particularly, relate to a display device with reduced power consumption and improved display quality, and a driving method thereof.

2. Description of the Related Art

A light emitting display device among display devices displays an image by using a light emitting element that generates a light through the recombination of electrons and holes. The light emitting display device is typically driven with a low power while providing a fast response speed.

The display device may include a display panel for displaying an image, a scan driver for sequentially supplying scan signals to scan lines included in the display panel, and a data driver for supplying data signals to data lines included in the display panel.

SUMMARY

Embodiments of the disclosure provide a display device capable of reducing power consumption and improving display quality.

According to an embodiment, a display device includes a display panel including a first display area and a second display area, a data driver which outputs a plurality of data signals to the display panel, a scan driver a scan driver which outputs a plurality of scan signals to the display panel, and a light emitting driver which outputs a plurality of emission control signals to the display panel.

In such an embodiment, the display panel displays a first image on the first display area and the second display area in a first mode, and displays a second image on the first display area in a second mode. In such an embodiment, the light emitting driver activates emission control signals among the plurality of emission control signals applied to the first display area and the second display area in the first mode.

In such an embodiment, the light emitting driver activates emission control signals applied to the second display area among the plurality of emission control signals during a first partial frame in the second mode, and maintains the emission control signals applied to the second display area in a deactivation state during a plurality of second partial frames in the second mode.

BRIEF DESCRIPTION OF THE DRAWINGS

The above and other features of the disclosure will become apparent by describing in detail embodiments thereof with reference to the accompanying drawings.

DETAILED DESCRIPTION

Figure 1:
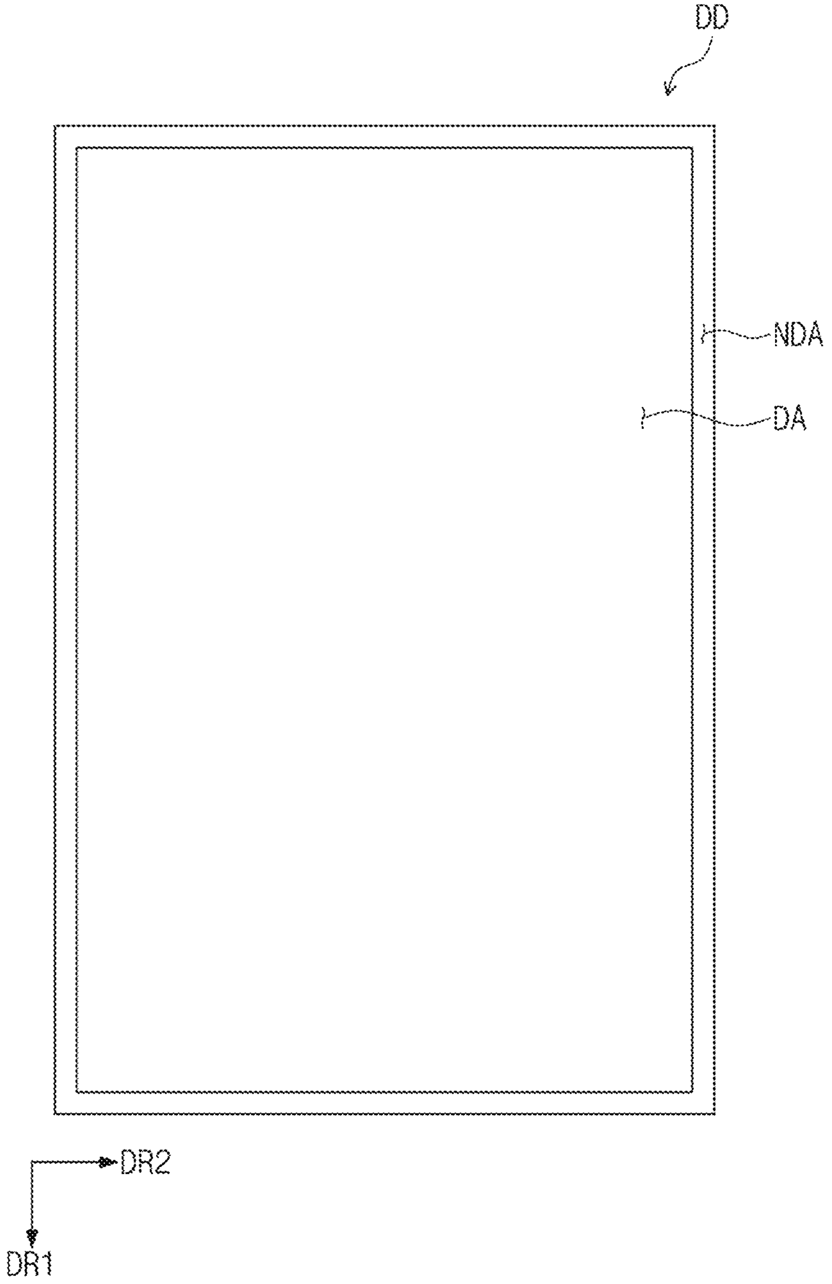
FIG. 1 is a plan view of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining. Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described in detail with reference to accompanying drawings.

Figure 2A:
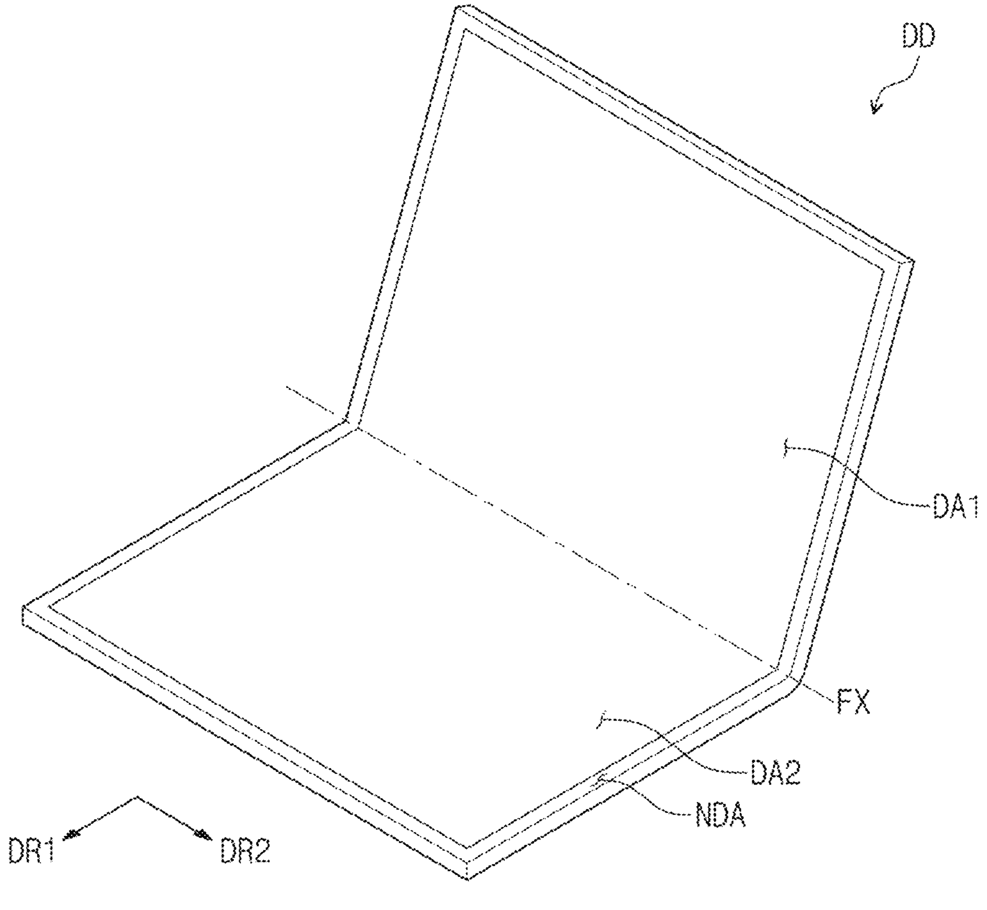
FIG. 2A is a perspective view illustrating an inner-folded state of a display device, according to an embodiment of the disclosure.
Figure 2B:
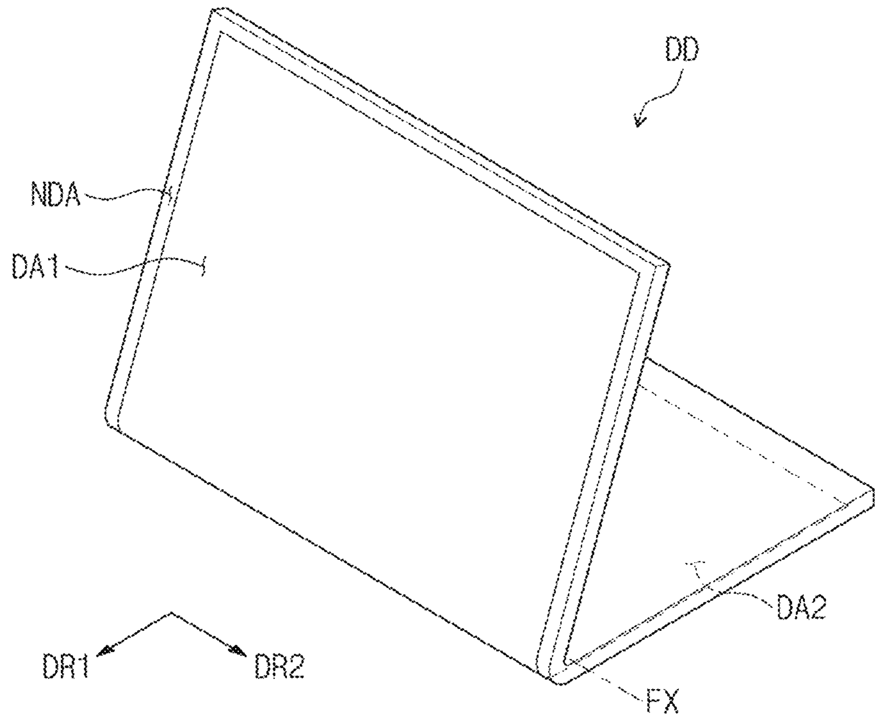
FIG. 2B is a perspective view illustrating an outer-folded state of a display device, according to an embodiment of the disclosure.

FIG. 1 is a plan view of a display device, according to an embodiment of the disclosure. FIG. 2A is a perspective view illustrating an inner-folded state of a display device, according to an embodiment of the disclosure. FIG. 2B is a perspective view illustrating an outer-folded state of a display device, according to an embodiment of the disclosure.

Referring to FIG. 1, an embodiment of a display device DD may be a device activated based on an electrical signal. The display device DD may be applied to an electronic device such as a smartphone, a smart watch, a tablet personal computer ("PC"), a notebook computer, a computer, a smart television, or the like.

The display device DD may include a display surface parallel to each of a first direction DR1 and a second direction DR2, and may display an image on the display surface. The display surface may correspond to a front surface of the display device DD.

The display surface of the display device DD may be divided into a display area DA and a non-display area NDA. The display area DA may be an area in which an image is actually displayed. A user perceives (or views) the image through the display area DA. In an embodiment, as shown in FIG. 1, the display area DA is in a quadrangle. However, this is illustrated as an example. Alternatively, the display area DA may have various shapes and may not be limited to an embodiment.

The non-display area NDA is adjacent to the display area DA. The non-display area NDA may have a given color. The non-display area NDA may surround the display area DA. Accordingly, a shape of the display area DA may be defined substantially by the non-display area NDA. However, this is illustrated as an example. Alternatively, the non-display area NDA may be disposed adjacent to only one side of the display area DA or may be omitted. Embodiments of the display device DD may be variously modified and is not limited to one embodiment.

Referring to FIGS. 1, 2A, and 2B, an embodiment of the display device DD may be a foldable display device. The display area DA of the display device DD may include a first display area DA1 and a second display area DA2 that are separated based on a folding axis FX. The folding axis FX may be parallel to the second direction DR2. In such an embodiment, the first and second display areas DA1 and DA2 may be arranged in the first direction DR1 perpendicular to the second direction DR2. In an embodiment where the folding axis FX is parallel to the first direction DR1, the first and second display areas DA1 and DA2 may be arranged in the second direction DR2.

In an embodiment, the display device DD may be inner-folded such that the first and second display areas DA1 and DA2 face each other as shown in FIG. 2A. In an alternative embodiment, the display device DD may be outer-folded such that the first and second display areas DA1 and DA2 are exposed to the outside as shown in FIG. 2B.

The display device DD may operate in a first mode for displaying an image by using both the first and second display areas DA1 and DA2 or may operate in a second mode for displaying an image by using only one of the first and second display areas DA1 and DA2. In an embodiment, for example, the display device DD may operate in the first mode in an unfolded state or may operate in the second mode in a folded state.

It is illustrated that the display device DD shown in FIGS. 2A and 2B operates in the second mode. In this case, in the second mode, the first display area DA1 is used to display an image. On the other hand, the second display area DA2 is not used to display an image. Here, the image may be defined as an image including information to be provided to a user.

Figure 3A:
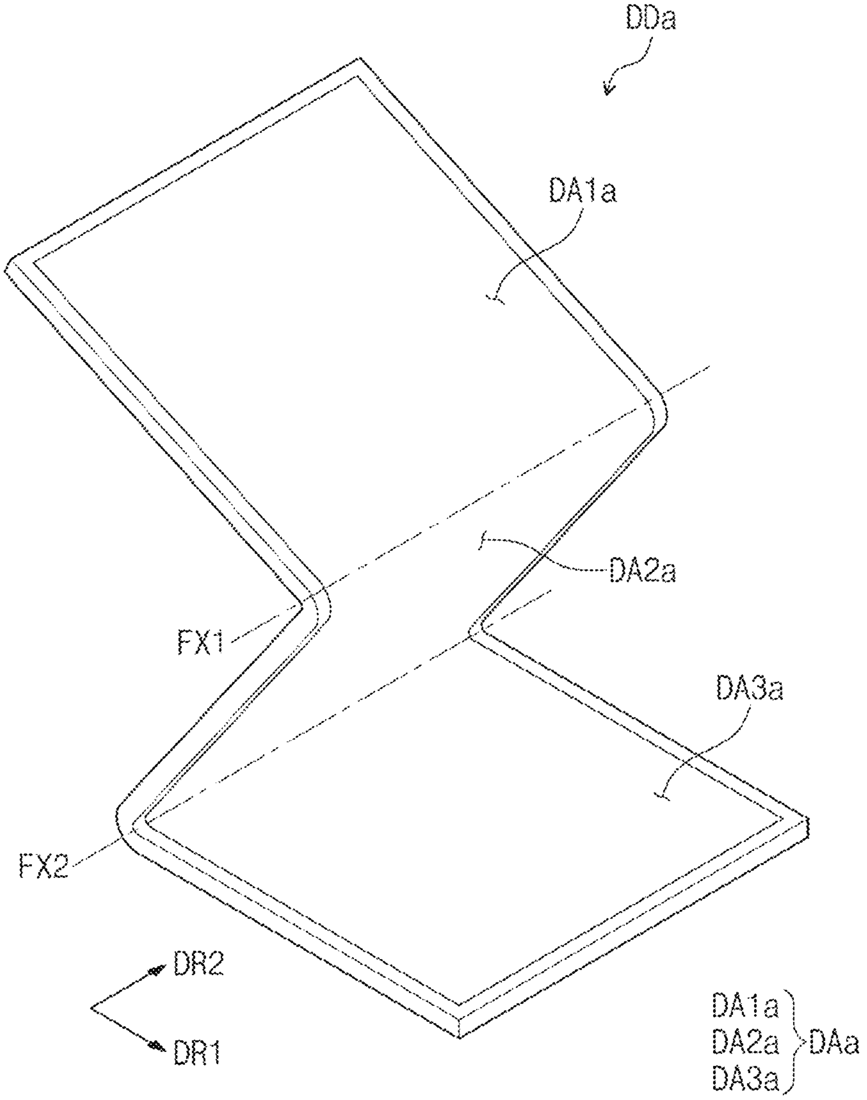
FIG. 3A is a perspective view illustrating a display device, according to an embodiment of the disclosure.
Figure 3B:
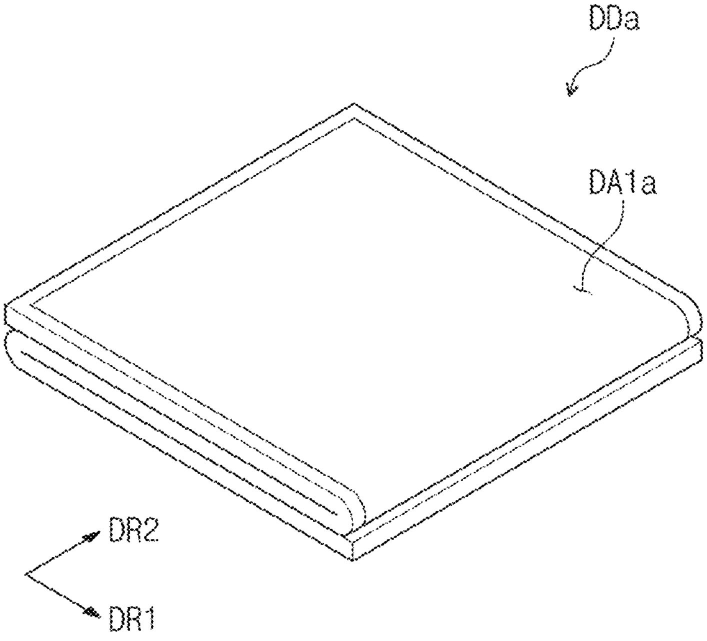
FIG. 3B is a perspective view illustrating a folded state of the display device shown in FIG. 3A.

FIG. 3A is a perspective view illustrating a display device, according to an embodiment of the disclosure. FIG. 3B is a perspective view illustrating a folded state of the display device shown in FIG. 3A.

Referring to FIGS. 3A and 3B, a display device DDa may be folded by a first folding axis FX1 and a second folding axis FX2.

A display area DAa of the display device DDa may include a first display area DA1*a*, a second display area DA2*a*, and a third display area DA3*a*, which are separated based on the first and second folding axes FX1 and FX2. Each of the first and second folding axes FX1 and FX2 may be parallel to the second direction DR2. In this case, the first to third display areas DA1*a*, DA2*a*, and DA3*a* may be arranged in the first direction DR1 perpendicular to the second direction DR2. When the first and second folding axes FX1 and FX2 are parallel to the first direction DR1, the first to third display areas DA1*a*, DA2*a*, and DA3*a* may be arranged in the second direction DR2.

The display device DDa may operate in the first mode for displaying an image by using all of the first to third display areas DA1*a*, DA2*a*, and DA3*a*. The display device DDa may operate in the second mode for displaying an image by using only one or two of the first to third display areas DA1*a*, DA2*a*, and DA3*a*. In an embodiment, for example, the display device DDa may operate in the first mode in an unfolded state or may operate in the second mode in a folded state.

FIG. 3B shows an embodiment of the display device DDa operating in the second mode. In such an embodiment, in the second mode, the first display area DA1*a* is used to display an image. In the second mode, the second and third display areas DA2*a* and DA3*a* are not used to display an image. Here, the image may be defined as an image including information to be provided to a user.

Figure 4:
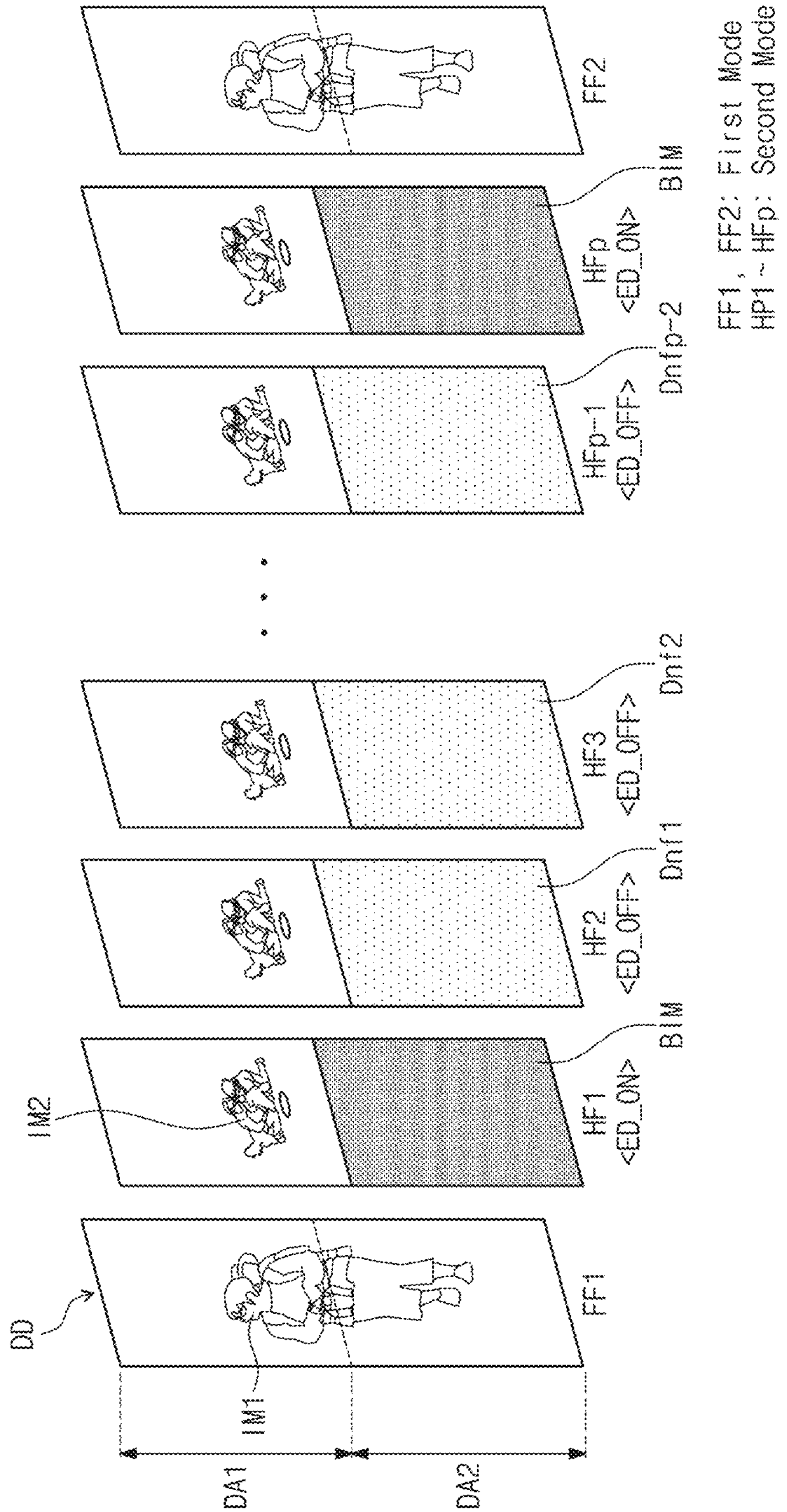
FIG. 4 is a diagram for describing an operation of a display device, according to an embodiment of the disclosure.

FIG. 4 is a diagram for describing an operation of a display device, according to an embodiment of the disclosure.

Referring to FIG. 4, an embodiment of the display device DD may operate in a first mode or a second mode. The first mode may be a normal mode in which both the first and second display areas DA1 and DA2 operate normally. The second mode may be a partial operating mode in which only one of the first and second display areas DA1 and DA2 operates normally. Here, the normally-operating may mean that an operation of displaying an image including information to be provided to a user is performed.

In the first mode, the display device DD may operate in a full frame unit in which both the first display area DA1 and the second display area DA2 are driven. For convenience of description, FIG. 4 illustrates two full frames (i.e., first and second full frames FF1 and FF2). In the second mode, the display device DD may operate in partial frame unit in which only the first display area DA1 is driven. For convenience of description, FIG. 4 illustrates 'p' partial frames (i.e., first to p-th partial frames HF1 to HFp). Here, 'p' may be an integer of 1 or more.

When an operating frequency of the first mode is the same as an operating frequency of the second mode, the duration of each of the first and second full frames FF1 and FF2 may be the same as the duration of each of the first to p-th partial frames HF1 to HFp. When the operating frequency of the first mode is different from the operating frequency of the second mode, the duration of each of the first and second full frames FF1 and FF2 may be different from the duration of each of the first to p-th partial frames HF1 to HFp.

In the first mode, the display device DD displays an image by using the first and second display areas DA1 and DA2. In the first mode, an image displayed in the first and second display areas DA1 and DA2 are referred to as a "first image IM1". In the second mode, the display device DD displays an image by using only one display area among the first and second display areas DA1 and DA2. In the second mode, an image displayed in the one display area is referred to as a "second image IM2". In an embodiment of the disclosure, the first display area DA1 may display the second image IM2 in the second mode.

In the second mode, the second display area DA2 may display an image BIM (e.g., a black image having a black grayscale) having a specific grayscale during at least one partial frame. Here, the black image BIM may be defined as an image displayed by a black data signal having a black grayscale. However, the disclosure is not limited thereto. The black image BIM may be defined as an image displayed by a low-grayscale data signal having a specific grayscale (e.g., low-grayscale). A black data signal and a low-grayscale data signal may be collectively referred to as a "bias data signal".

In an embodiment of the disclosure, after entering the second mode, the second display area DA2 may display the black image BIM during an initial (or start) partial frame HF1 (i.e., the first partial frame), and the second display area DA2 may display the black image BIM during the last partial frame HFp (i.e., the p-th partial frame) immediately before exiting or terminating the second mode. To display the black image BIM during the first partial frame HF1 and the p-th partial frame HFp, a light emitting element ED (see FIG. 6) of pixels PX (see FIG. 5) disposed in the second display area DA2 may be turned on (ED_ON). FIG. 4 illustrates an embodiment where the black image BIM is displayed during the first and p-th partial frames HF1 and HFp. However, the frame for displaying the black image BIM is not limited thereto. In an alternative embodiment, for example, the black image BIM may be displayed during only the first partial frame HF1. Alternatively, the black image BIM may be further displayed even during one partial frame among the second to (p−1)-th partial frames HF2 to HFp−1.

In the second mode, during at least one partial frame, a non-fixed data signal may be written in pixels of the second display area DA2. The non-fixed data signal may be a data signal corresponding to one of a plurality of specific images. In an embodiment of the disclosure, during the second partial frame HF2, a first non-fixed data signal Dnf1 corresponding to one of the plurality of specific images may be written in pixels of the second display area DA2. During the third partial frame HF3, a second non-fixed data signal Dnf2 corresponding to one of the plurality of specific images may be written in pixels of the second display area DA2. During the (p−1)-th partial frame HFp−1, a (p−2)-th non-fixed data signal Dnfp−2 corresponding to one of the plurality of specific images may be written in pixels of the second display area DA2. In such an embodiment, during each of the second to (p−1)-th partial frames, a plurality of non-fixed data signals may be randomly written in pixels of the second display area DA2. The first, second, and (p−2)-th non-fixed data signals Dnf1, Dnf2, and Dnfp−2 may be the same as or different from one another. When the non-fixed data signals Dnf1, Dnf2, and Dnfp−2 are written during the second to (p−1)-th partial frames HF2 to HFp−1, the light emitting elements ED of the pixels PX disposed in the second display area DA2 may be turned off (ED_OFF). Accordingly, the non-fixed data signals Dnf1, Dnf2, and Dnfp−2 are not displayed as images in the second display area DA2.

An operation of the light emitting element ED in the second mode will be described in detail later with reference to FIGS. 8 to 14.

Figure 5:
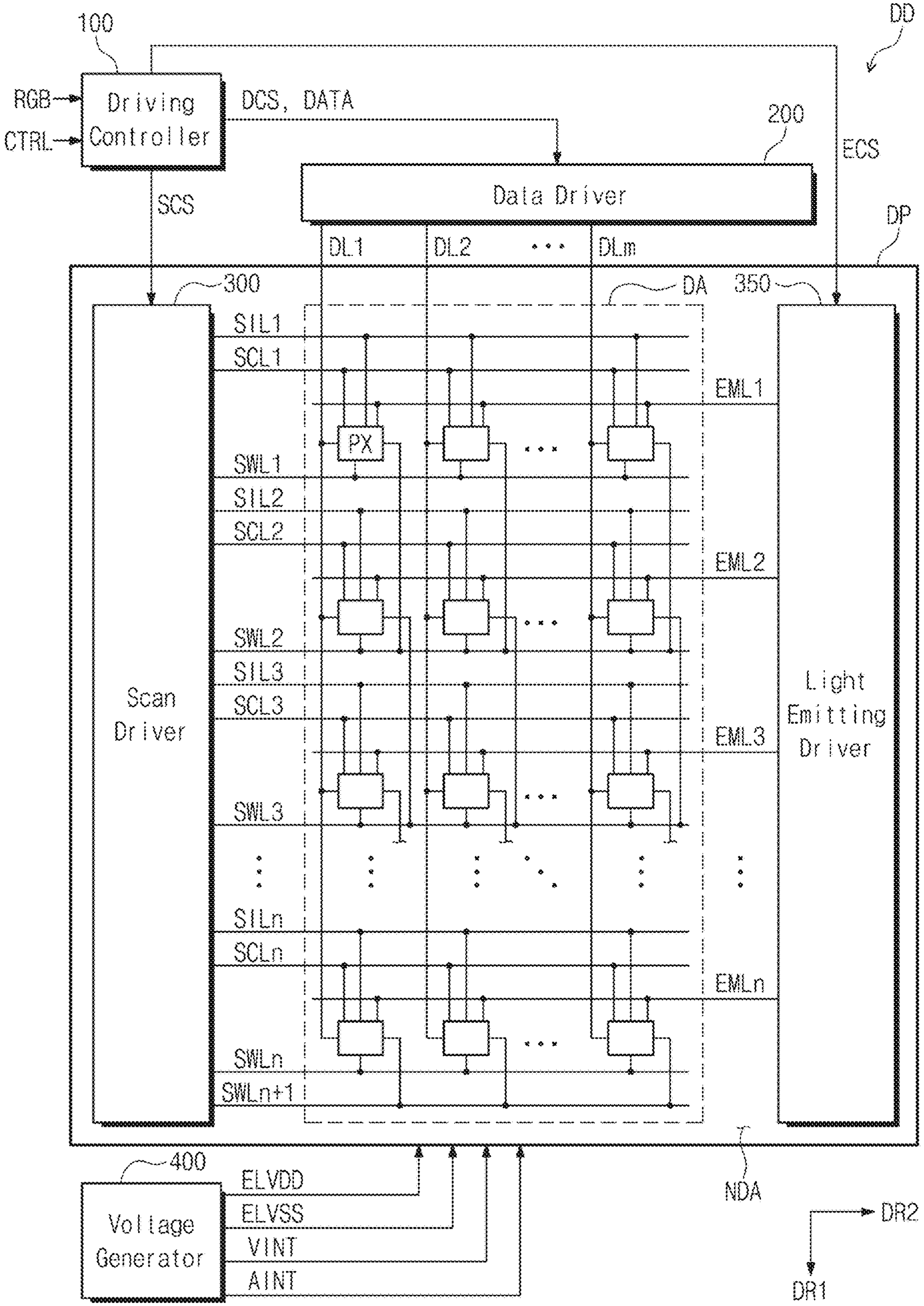
FIG. 5 is a block diagram of a display device, according to an embodiment of the disclosure.
Figure 6:
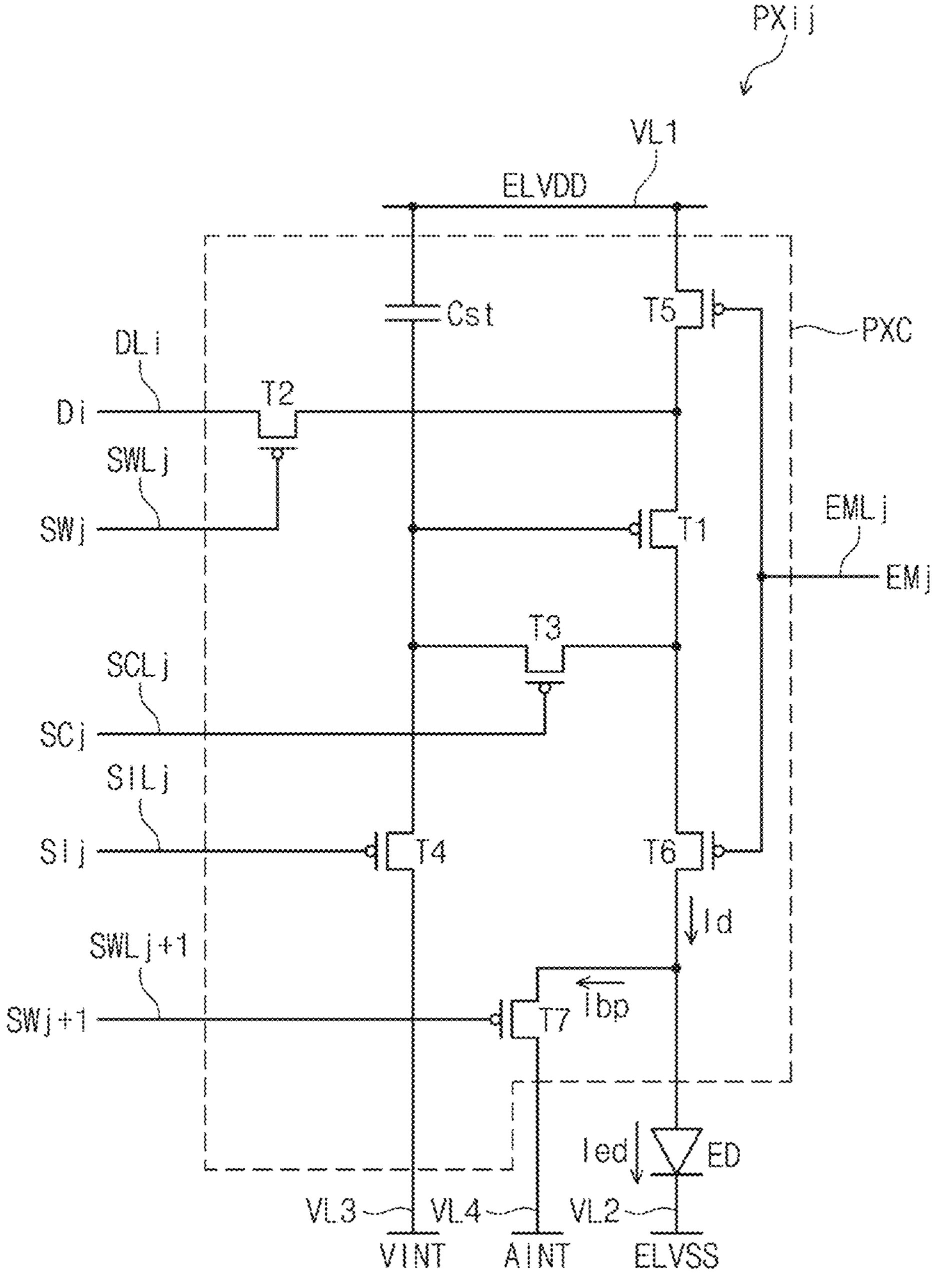
FIG. 6 is a circuit diagram of a pixel, according to an embodiment of the disclosure.
Figure 7:
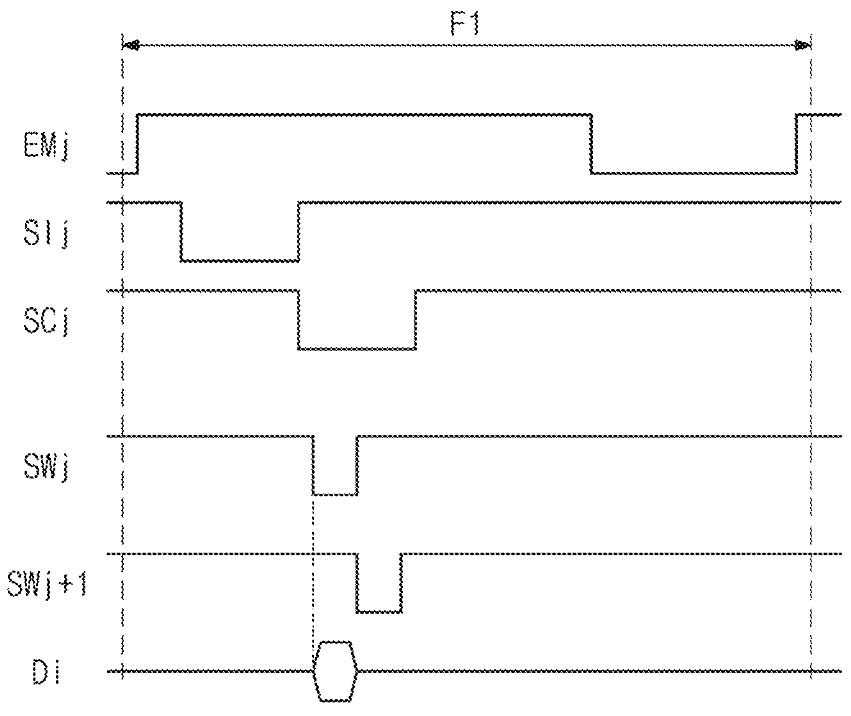
FIG. 7 is a timing diagram for describing an operation of a pixel illustrated in FIG. 6.

FIG. 5 is a block diagram of a display device, according to an embodiment of the disclosure. FIG. 6 is a circuit diagram of a pixel, according to an embodiment of the disclosure. FIG. 7 is a timing diagram for describing an operation of a pixel illustrated in FIG. 6.

Referring to FIGS. 5 and 6, an embodiment of the display device DD includes a display panel DP, a panel driver for driving the display panel DP, and a driving controller 100 for controlling an operation of the panel driver. According to an embodiment of the disclosure, the panel driver includes a data driver 200, a scan driver 300, a light emitting driver 350, and a voltage generator 400.

The driving controller 100 receives an input image signal RGB and a control signal CTRL. The driving controller 100 generates image data DATA by converting a data format of the input image signal RGB in compliance with the specification for an interface with the data driver 200. The driving controller 100 generates a first driving control signal SCS, a second driving control signal DCS, and a third driving control signal ECS based on the control signal CTRL.

The data driver 200 receives the second driving control signal DCS and the image data DATA from the driving controller 100. The data driver 200 converts the image data DATA into data signals and outputs the data signals to a plurality of data lines DL1 to DLm to be described later. The data signals refer to analog voltages corresponding to grayscale values of the image data DATA. The non-fixed data signals Dnf1, Dnf2, and Dnfp−2 shown in FIG. 4 may also be signals output from the data driver 200.

The scan driver 300 receives the first driving control signal SCS from the driving controller 100. The scan driver 300 may output scan signals to scan lines in response to the first driving control signal SCS.

The voltage generator 400 generates voltages used to operate the display panel DP. In an embodiment, the voltage generator 400 generates a first driving voltage ELVDD, a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, emission control lines EML1 to EMLn, data lines DL1 to DLm, and pixels PX. The initialization scan lines SIL1 to SILn, the compensation scan lines SCL1 to SCLn, the write scan lines SWL1 to SWLn+1, the emission control lines EML1 to EMLn, the data lines DL1 to DLm, and the pixels PX may overlap the display area DA. The initialization scan lines SIL1 to SILn, the compensation scan lines SCL1 to SCLn, the write scan lines SWL1 to SWLn+1, and the emission control lines EML1 to EMLn extend in the second direction DR2. The initialization scan lines SIL1 to SILn, the compensation scan lines SCL1 to SCLn, the write scan lines SWL1 to SWLn+1, and the emission control lines EML1 to EMLn are arranged spaced from one another in the first direction DR1. The data lines DL1 to DLm extend in the first direction DR1 and are arranged spaced from one another in the second direction DR2.

The plurality of pixels PX are electrically connected to the initialization scan lines SILL to SILn, the compensation scan lines SCL1 to SCLn, the write scan lines SWL1 to SWLn+1, the emission control lines EML1 to EMLn, and the data lines DL1 to DLm. Each of the plurality of pixels PX may be electrically connected with four scan lines. In an embodiment, for example, as illustrated in FIG. 4, the first row of pixels may be connected to the first initialization scan line SILL the first compensation scan line SCL1, and the first and second write scan lines SWL1 and SWL2. In such an embodiment, the second row of pixels may be connected to the second initialization scan line SIL2, the second compensation scan line SCL2, and the second and third write scan lines SWL2 and SWL3.

The scan driver 300 may be disposed in the non-display area NDA of the display panel DP. The scan driver 300 receives the first driving control signal SCS from the driving controller 100. In response to the first driving control signal SCS, the scan driver 300 may output initialization scan signals to the initialization scan lines SIL1 to SILn, may output compensation scan signals to the compensation scan lines SCL1 to SCLn, and may output write scan signals to the write scan lines SWL1 to SWLn+1. The circuit configuration and operation of the scan driver 300 will be described in detail later.

The light emitting driver 350 receives the third driving control signal ECS from the driving controller 100. The light emitting driver 350 may output emission control signals to the emission control lines EML1 to EMLn in response to the third driving control signal ECS. In an embodiment, the scan driver 300 may be connected to the emission control lines EML1 to EMLn. In such an embodiment, the scan driver 300 may output emission control signals to the emission control lines EML1 to EMLn.

Each of the plurality of pixels PX includes a light emitting element ED and a pixel circuit unit PXC for controlling light emission of the light emitting element ED. The pixel circuit unit PXC may include a plurality of transistors and a capacitor. The scan driver 300 and the light emitting driver 350 may include transistors formed through the same process as the pixel circuit unit PXC.

Each of the plurality of pixels PX receives the first driving voltage ELVDD, the second driving voltage ELVSS, the first initialization voltage VINT, and the second initialization voltage AINT from the voltage generator 400.

FIG. 6 illustrates an equivalent circuit diagram of one pixel PXij among the plurality of pixels PX illustrated in FIG. 5. Hereinafter, a circuit structure of an embodiment of the pixel PXij will be described. The plurality of pixels PX have a same structure as each other, and thus, any repetitive detailed description associated with the remaining pixels will be omitted to avoid redundancy. The pixel PXij is connected to the i-th data line DLi (hereinafter referred to as a "data line") among the data lines DL1 to DLm, the j-th initialization scan line SILj (hereinafter referred to as an "initialization scan line") among the initialization scan lines SIL1 to SILn, the j-th compensation scan line SCLj (hereinafter referred to as a "compensation scan line") among the compensation scan lines SCL1 to SCLn, the j-th and (j+1)-th write scan lines SWLj and SWLj+1 (hereinafter referred to as "first and second write scan lines") among the write scan lines SWL1 to SWLn+1, and the j-th emission control line EMLj (hereinafter referred to as an "emission control line") among the emission control lines EML1 to EMLn.

The pixel PXij includes a light emitting element ED and a pixel circuit unit PXC. The pixel circuit unit PXC includes first to seventh transistors T1, T2, T3, T4, T5, T6, and T7 and a single capacitor Cst. Each of the first to seventh transistors T1 to T7 may be a transistor having a low-temperature polycrystalline silicon ("LTPS") semiconductor layer. In an embodiment, all of the first to seventh transistors T1 to T7 may be P-type transistors. However, the disclosure is not limited thereto. In an alternative embodiment, for example, all of the first to seventh transistors T1 to T7 may be N-type transistors. In another alternative embodiment, for example, some of the first to seventh transistors T1 to T7 may be P-type transistors, and the remaining transistors may be N-type transistors. In an embodiment, for example, among the first to seventh transistors T1 to T7, the first, second, and fifth to seventh transistors T1, T2, and T5 to T7 are P-type transistors, and the third and fourth transistors T3 and T4 may be N-type transistors by using an oxide semiconductor as a semiconductor layer. However, a configuration of the pixel circuit unit PXC according to the disclosure is not limited to the embodiment illustrated in FIG. 6. The pixel circuit unit PXC illustrated in FIG. 6 is only an example. In an embodiment, for example, the configuration of the pixel circuit unit PXC may be modified and implemented. In an embodiment, for example, all of the first to seventh transistors T1 to T7 may be P-type transistors or N-type transistors.

The initialization scan line SILj may deliver the j-th initialization scan signal SIj (hereinafter referred to as an "initialization scan signal") to the pixel PXij; the compensation scan line SCLj may deliver the j-th compensation scan signal SCj (hereinafter referred to as a "compensation scan signal") to the pixel PXij, the first and second write scan lines SWLj and SWLj+1 may deliver the j-th and (j+1)-th write scan signals SWj and SWj+1 (hereinafter referred to as "first and second write scan signals") to the pixel PXij, and, the emission control line EMLj may deliver the j-th emission control signal EMj (hereinafter referred to as an "emission control signal") to the pixel PXij. The data line DLi delivers a data signal Di to the pixel PXij. The data signal Di may have a voltage level corresponding to the grayscale of the corresponding image signal among the image signal RGB entered into the display device DD (see FIG. 5). First to fourth driving voltage lines VL1, VL2, VL3, and VL4 may deliver the first driving voltage ELVDD, the second driving voltage ELVSS, the first initialization voltage VINT, and the second initialization voltage AINT to the pixel PXij, respectively.

The first transistor T1 includes a first electrode connected to the first driving voltage line VL1 via the fifth transistor T5, a second electrode electrically connected to the anode of the light emitting element ED via the sixth transistor T6, and a gate electrode connected to one end of the capacitor Cst. The first transistor T1 may receive the data signal Di delivered through the data line DLi based on the switching operation of the second transistor T2 and then may supply a driving current Id to the light emitting element ED.

The second transistor T2 includes a first electrode connected to the data line DLi, a second electrode connected to the first electrode of the first transistor T1, and a gate electrode connected to the first write scan line SWLj. The second transistor T2 may be turned on in response to the first write scan signal SWj received through the first write scan line SWLj and then may deliver the data signal Di delivered from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 may be turned on in response to the compensation scan signal SCj received through the compensation scan line SCLj, and thus, the gate electrode and the second electrode of the first transistor T1 may be connected to each other, that is, the first transistor T1 may be diode-connected.

The fourth transistor T4 includes a first electrode connected to the gate electrode of the first transistor T1, a second electrode connected to the third voltage line VL3 through which the first initialization voltage VINT is delivered, and a gate electrode connected to the initialization scan line SILj. The fourth transistor T4 may be turned on in response to the initialization scan signal SIj received through the initialization scan line SILj and may perform an initialization operation of initializing the voltage of the gate electrode of the first transistor T1 by delivering the first initialization voltage VINT to the gate electrode of the first transistor T1.

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 are simultaneously turned on in response to the emission control signal EMj received through the emission control line EMLj. The first driving voltage ELVDD applied through the turned-on fifth transistor T5 may be compensated through the diode-connected first transistor T1 and then may be delivered to the light emitting element ED.

The seventh transistor T7 includes a first electrode connected to the second electrode of the sixth transistor T6, a second electrode connected to the fourth driving voltage line VL4, through which the second initialization voltage AINT is delivered, and a gate electrode connected to the second write scan line SWLj+1.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2 that delivers the second driving voltage ELVSS.

Referring to FIGS. 6 and 7, when the initialization scan signal SIj having a low level is provided through the initialization scan line SILj during an initialization period of one frame F1, the fourth transistor T4 is turned on in response to the initialization scan signal SIj having the low level. The first initialization voltage VINT is delivered to the gate electrode of the first transistor T1 through the turned-on fourth transistor T4, and the gate electrode of the first transistor T1 is initialized by the first initialization voltage VINT.

Next, when the compensation scan signal SCj having a low level is supplied through the compensation scan line SCLj during the initialization period of the one frame F1, the third transistor T3 is turned on. A compensation period may not overlap the initialization period. An activation period of the compensation scan signal SCj is defined as a period in which the compensation scan signal SCj has a low level. An activation period of the initialization scan signal SIj is defined as a period in which the initialization scan signal SIj has a low level. The activation period of the compensation scan signal SCj may not overlap the activation period of the initialization scan signal SIj. The activation period of the initialization scan signal SIj may precede the activation period of the compensation scan signal SCj.

During the compensation period, the first transistor T1 is diode-connected by the third transistor T3 turned on and is forward-biased. in an embodiment, the compensation period may include a data write period in which the first write scan signal SWj is generated to have a low level. During the data write period, the second transistor T2 is turned on by the first write scan signal SWj having the low level. Then, a compensation voltage (Di-Vth) obtained by reducing the voltage of the data signal Di supplied from the data line DLi by the threshold voltage (Vth) of the first transistor T1 is applied to the gate electrode of the first transistor T1. That is, the potential of the gate electrode of the first transistor T1 may be the compensation voltage (Di-Vth).

The first driving voltage ELVDD and the compensation voltage (Di-Vth) may be applied to both ends of the capacitor Cst, and charges corresponding to a voltage difference between both ends may be stored in the capacitor Cst.

Then, the seventh transistor T7 is turned on by receiving the second write scan signal SWj+1 having the low level through the second write scan line SWLj+1. A portion of the driving current Id may be drained through the seventh transistor T7 as a bypass current Ibp.

In a case where the pixel PXij displays a black image, when the light emitting element ED emits light even though the minimum driving current of the first transistor T1 flows as the driving current Id, the pixel PXij may not normally display a black image. Accordingly, the seventh transistor T7 of the pixel PXij according to an embodiment of the disclosure may drain (or disperse) a part of the minimum current of the first transistor T1 to a current path, which is different from a current path to the light emitting element ED, as the bypass current Ibp. Herein, the minimum driving current of the first transistor T1 means the current flowing into the first transistor T1 under the condition that the first transistor T1 is turned off because the gate-source voltage Vgs of the first transistor T1 is less than the threshold voltage Vth. As a minimum driving current (e.g., a current of 10 pA or less) flowing into the first transistor T1 is delivered to the light emitting element ED under a condition that the first transistor T1 is turned off, an image having a black grayscale is displayed. When the pixel PXij displays a black image, the bypass current Ibp has a relatively large influence on the minimum driving current. When the pixel PXij displays an image such as a normal image or a white image, the bypass current Ibp has little effect on the driving current Id. Accordingly, when the pixel PXij displays a black image, a current (i.e., a light emitting current Ted), which is obtained by reducing the driving current Id by the amount of the bypass current Ibp flowing through the seventh transistor T7 is provided to the light emitting element ED, and thus a black image may be clearly displayed. Accordingly, the pixel PXij may implement an accurate black grayscale image by using the seventh transistor T7, and thus a contrast ratio may be improved.

Next, the emission control signal EMj supplied from the emission control line EMLj is changed from a high level to a low level. The fifth transistor T5 and the sixth transistor T6 are turned on by the emission control signal EMj having a low level. In this case, the driving current Id is generated depending on a voltage difference between the gate voltage of the gate electrode of the first transistor T1 and the first driving voltage ELVDD and is supplied to the light emitting element ED through the sixth transistor T6, and the light emitting current Ted flows through the light emitting element ED.

Figure 8A:
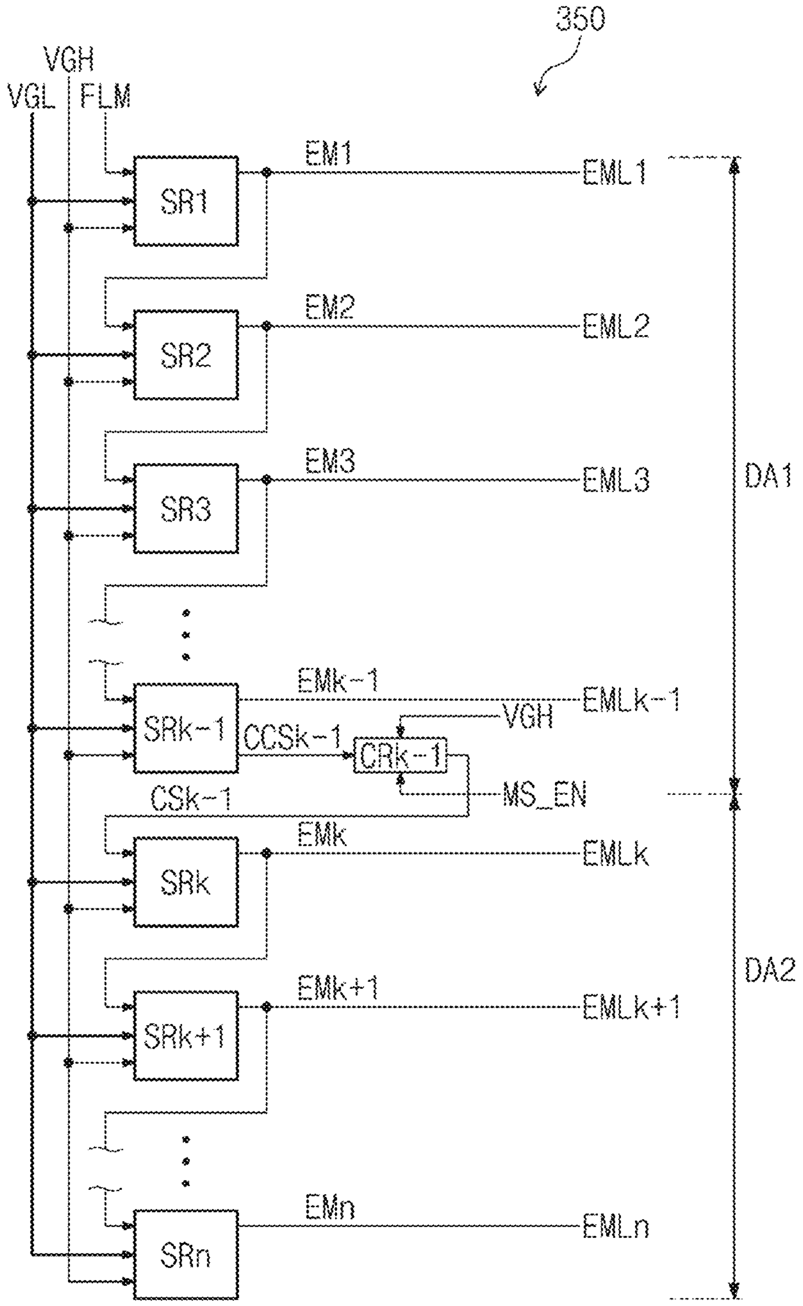
FIG. 8A is a block diagram of a light emitting driver, according to an embodiment of the disclosure.
Figure 8B:
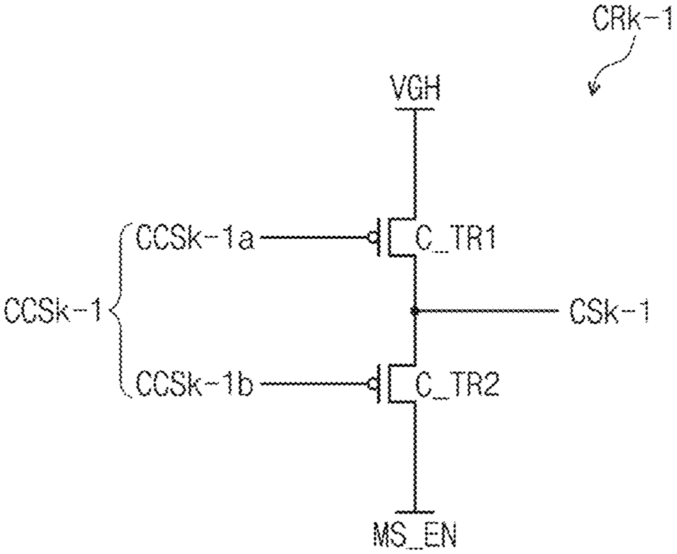
FIG. 8B is a circuit diagram of a carry circuit shown in FIG. 8A.

FIG. 8A is a block diagram of a light emitting driver, according to an embodiment of the disclosure. FIG. 8B is a circuit diagram of a carry circuit shown in FIG. 8A.

Referring to FIG. 8A, an embodiment of the light emitting driver 350 includes a plurality of stages SR1 to SRn and a carry circuit CRk−1.

Each of the stages SR1 to SRn receives the third driving control signal ECS from the driving controller 100 shown in FIG. 5. The third driving control signal ECS may include a start signal FLM, a clock signal, and a masking enable signal MS_EN. Each of the stages SR1 to SRn further receives a first voltage VGH and a second voltage VGL. The first voltage VGH and the second voltage VGL may be provided from the voltage generator 400 illustrated in FIG. 5.

The plurality of stages SR1 to SRn may be connected to the plurality of emission control lines EML1 to EMLn, respectively. The plurality of stages SR1 to SRn may output the plurality of emission control signals EM1 to EMn, respectively. The plurality of emission control signals EM1 to EMn output from the plurality of stages SR1 to SRn may be applied to the plurality of emission control lines EML1 to EMLn, respectively.

The plurality of stages SR1 to SRn may be dependently or cascadedly connected to one another. Some of the plurality of stages SR1 to SRn may receive an emission control signal output from the previous stage as a carry signal. The rest of the plurality of stages SR1 to SRn may receive the carry signal output from the carry circuit CRk−1.

Some (e.g., first to (k−1)-th emission control lines EML1 to EMLk−1) of the plurality of emission control lines EML1 to EMLn may be positioned in the first display area DA1. The rest (e.g., k-th to n-th emission control lines EMLk to EMLn) may be positioned in the second display area DA2. In an embodiment of the disclosure, the first to (k−1)-th emission control line EML1 to EMLk−1 of the plurality of emission control lines EML1 to EMLn are positioned in the first display area DA1. Here, 'k' may be an integer of 2 or more. The k-th to n-th emission control lines EMLk to EMLn among the plurality of emission control lines EML1 to EMLn are positioned in the second display area DA2. Here, 'k' may be an integer less than 'n'.

The (k−1)-th stage SRk−1 among the plurality of stages SR1 to SRn may provide a carry control signal CCSk−1 to the carry circuit CRk−1. The carry circuit CRk−1 may output a carry signal CSk−1 in response to the carry control signal CCSk−1. The carry circuit CRk−1 may receive the first voltage VGH and the masking enable signal MS_EN. The carry signal CSk−1 may have a potential corresponding to the first voltage VGH or the masking enable signal MS_EN.

Referring to FIG. 8B, the carry circuit CRk−1 may include first and second carry transistors C_TR1 and C_TR2. The carry control signal CCSk−1 may include a first carry control signal CCSk−1a provided to the first carry transistor C_TR1 and a second carry control signal CCSk−1b provided to the second carry transistor C_TR2. The first carry control signal CCSk−1a may have an inverted phase with the second carry control signal CCSk−1b. When the first carry transistor C_TR1 is turned on in response to the first carry control signal CCSk−1a, the second carry transistor C_TR2 is turned off in response to the second carry control signal CCSk−1b. When the first carry transistor C_TR1 is turned off in response to the first carry control signal CCSk−1a, the second carry transistor C_TR2 is turned on in response to the second carry control signal CCSk−1b.

When the first carry transistor C_TR1 is turned on and the second carry transistor C_TR2 is turned off, the carry circuit CRk−1 outputs the first voltage VGH as the carry signal CSk−1. When the first carry transistor C_TR1 is turned off and the second carry transistor C_TR2 is turned on, the carry circuit CRk−1 outputs the masking enable signal MS_EN as the carry signal CSk−1. When the carry signal CSk−1 has a same voltage level as the first voltage VGH, the carry signal CSk−1 is deactivated. When the carry signal CSk−1 has a same voltage level as the second voltage VGL, the carry signal CSk−1 is activated. Here, the carry signal CSk−1 may be activated or deactivated in the second mode by adjusting the voltage level of the masking enable signal MS_EN.

Referring back to FIG. 8A, the k-th stage SRk among the plurality of stages SR1 to SRn may receive the carry signal CSk−1 from the carry circuit CRk−1. When the carry signal CSk−1 supplied to the k-th stage SRk is activated, the k-th stage SRk may activate the k-th emission control signal EMk in response to the activated the carry signal CSk−1. However, when the carry signal CSk−1 is deactivated, the k-th stage SRk may maintain the k-th emission control signal EMk in an inactive state in response to the deactivated carry signal CSk−1. When the k-th emission control signal EMk is maintained in an inactive state, the (k+1)-th to n-th emission control signals EMk+1 to EMn respectively output from the (k+1)-th to n-th stages SRk+1 to SRn are also not activated.

Figure 9A:
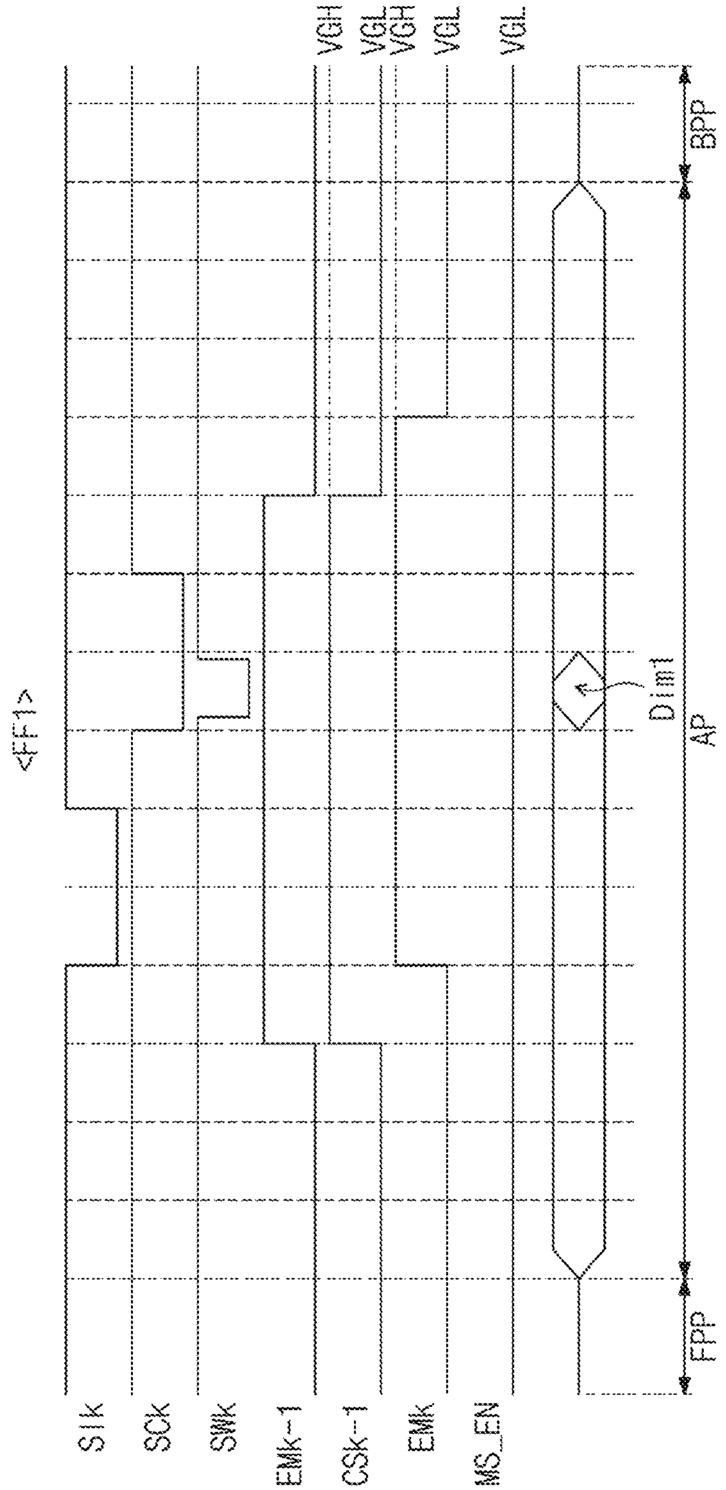
FIGS. 9A to 9D are waveform diagrams for describing operations of a light emitting driver and a scan driver in first and second modes, according to an embodiment of the disclosure.
Figure 9B:
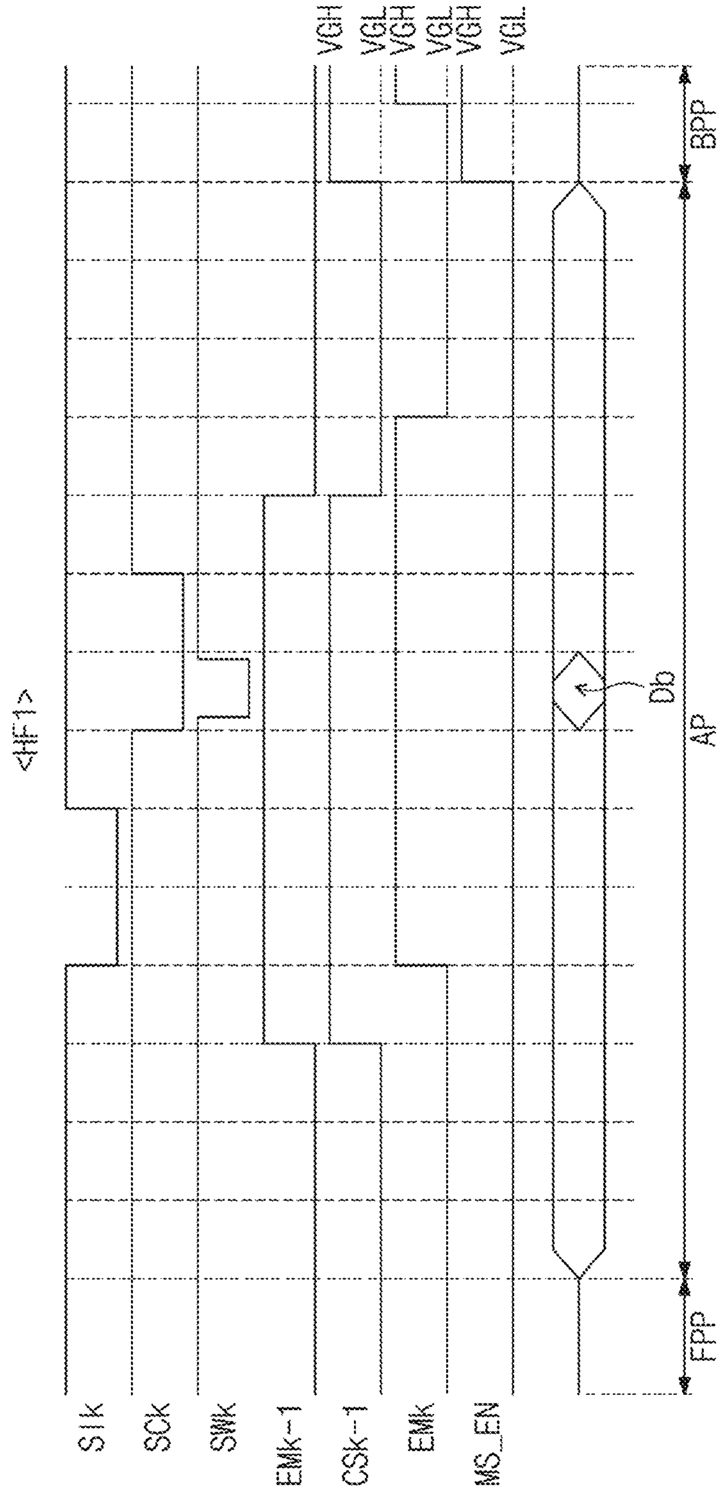
Figure 9C:
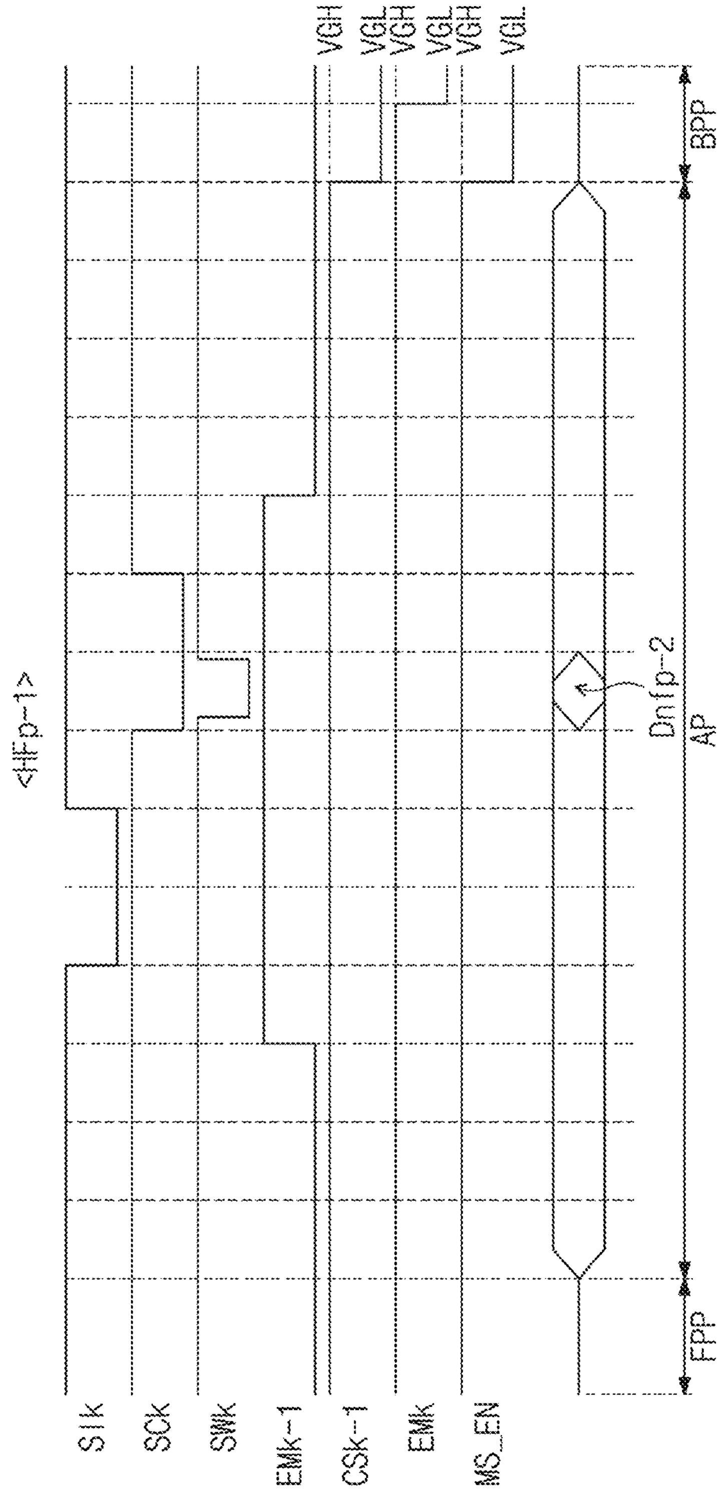
Figure 9D:
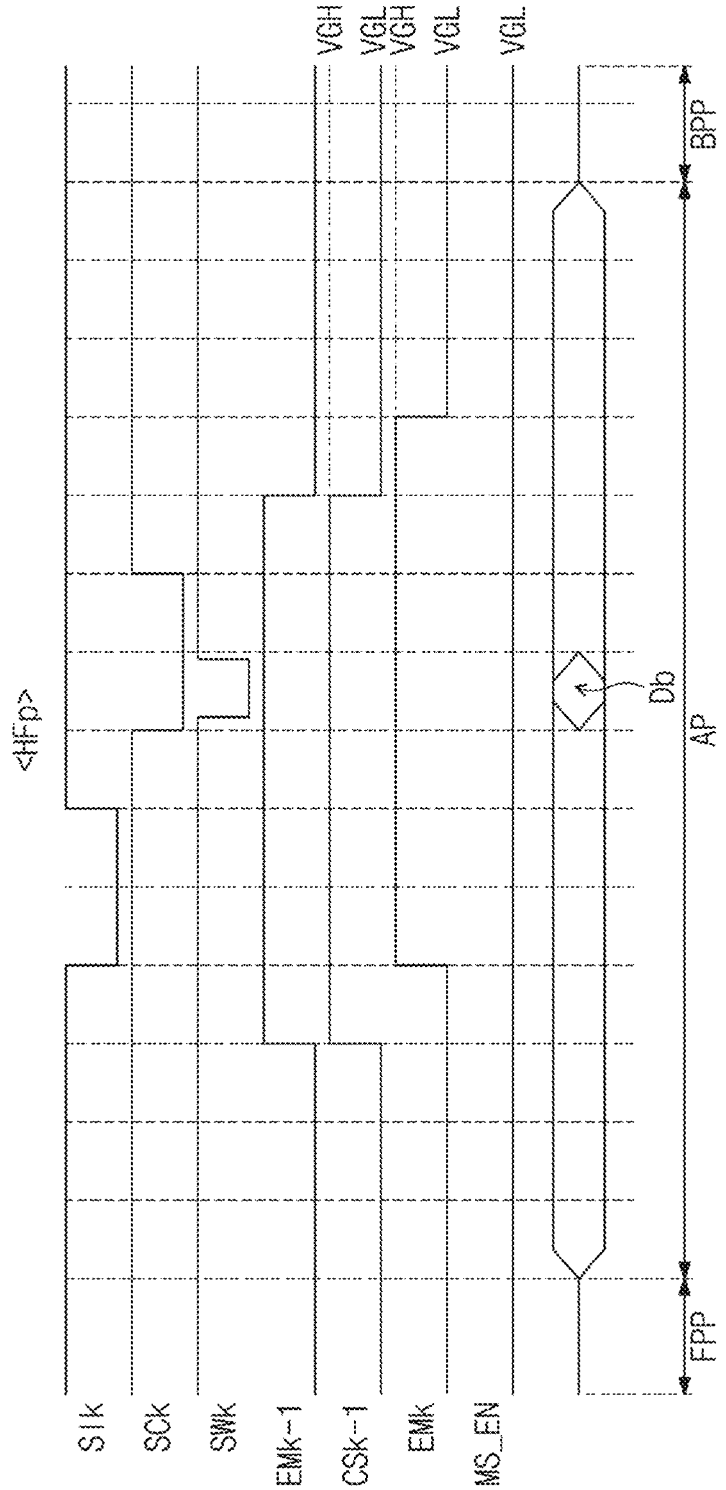

FIG. 9A is a waveform diagram for describing operations of a light emitting driver and a scan driver in the first full frame shown in FIG. 4. FIG. 9B is a waveform diagram for describing operations of a light emitting driver and a scan driver in the first partial frame shown in FIG. 4. FIG. 9C is a waveform diagram for describing operations of a light emitting driver and a scan driver in the (p−1)-th partial frame shown in FIG. 4. FIG. 9D is a waveform diagram for describing operations of a light emitting driver and a scan driver in the p-th partial frame shown in FIG. 4.

Hereinafter, operations of the first and second modes will be described in detail with reference to FIGS. 9A to 9D. FIGS. 9A to 9D illustrate the k-th initialization scan signal SIk, the k-th compensation scan signal SCk, the k-th write scan signal SWk, and the k-th emission control signal EMk, which are applied to a k-th row of pixels. Furthermore, FIGS. 9A to 9D illustrate the (k−1)-th emission control signal EMk−1 output from the (k−1)-th stage SRk−1 (see FIG. 8A), the carry signal CSk−1 output from the carry circuit CRk−1 (see FIG. 8A), and the masking enable signal MS_EN supplied to the carry circuit CRk−1.

Referring to FIGS. 4, 8A, 8B, and 9A, during the first full frame FF1, the k-th row of pixels positioned in the second display area DA2 may display the first image IM1 in response to the k-th initialization scan signal SIk, the k-th compensation scan signal SCk, the k-th write scan signal SWk, and the k-th emission control signal EMk, which are activated. Here, data signals Dim1 corresponding to the first image IM1 may be supplied to the k-th row of pixels.

The first full frame FF1 may include an active period AP, in which the data signals Dim1 are supplied, and a porch period in which the data signals Dim1 are not supplied. The porch period may include a front porch period FPP preceding the active period AP and a back porch period BPP following the active period AP. An activation period of each of the k-th initialization scan signal SIk, the k-th compensation scan signal SCk, and the k-th write scan signal SWk may overlap the active period AP.

The k-th stage SRk may activate or deactivate the k-th emission control signal EMk in response to the carry signal CSk−1. The carry signal CSk−1 may be a signal supplied from the carry circuit CRk−1, and may be generated with a same phase as the (k−1)-th emission control signal EMk−1 during the first full frame FF1. That is, in the first mode, the carry signal CSk−1 may have a same phase as the (k−1)-th emission control signal EMk−1.

The masking enable signal MS_EN supplied to the carry circuit CRk−1 during the first full frame FF1 may have a same level as the second voltage VGL. When the first carry control signal CCSk−1a is applied to the carry circuit CRk−1 and then the carry signal CSk−1 has a voltage level corresponding to the first voltage VGH, the k-th emission control signal EMk may enter a deactivation period. Afterward, when the second carry control signal CCSk−1b is applied to the carry circuit CRk−1 and then the carry signal CSk−1 has a voltage level (i.e., a voltage level corresponding to the second voltage VGL) corresponding to the masking enable signal MS_EN, the k-th emission control signal EMk may enter an activation period. Accordingly, in the first mode, the light emitting elements ED (see FIG. 6) included in pixels positioned in the second display area DA2 are turned on to display the first image IM1.

Referring to FIGS. 4, 8A, 8B, and 9B, during the first partial frame HF1, the k-th row of pixels positioned in the second display area DA2 may display the black image BIM in response to the k-th initialization scan signal SIk, the k-th compensation scan signal SCk, the k-th write scan signal SWk, and the k-th emission control signal EMk, which are activated. Here, a black data signal Db having a black grayscale may be supplied to the k-th row of pixels.

The masking enable signal MS_EN supplied to the carry circuit CRk−1 during the first partial frame HF1 may have a same level as the second voltage VGL. When the first carry control signal CCSk−1a is applied to the carry circuit CRk−1 and then the carry signal CSk−1 has a voltage level corresponding to the first voltage VGH, the k-th emission control signal EMk may enter a deactivation period. Afterward, when the second carry control signal CCSk−1b is applied to the carry circuit CRk−1 and then the carry signal CSk−1 has a voltage level (i.e., a voltage level corresponding to the second voltage VGL) corresponding to the masking enable signal MS_EN, the k-th emission control signal EMk may enter an activation period. Accordingly, during the first partial frame HF1, the light emitting elements ED (see FIG. 6) included in pixels positioned in the second display area DA2 may be turned on (ED_ON) to display the black image BIM corresponding to the black data signal Db.

In an embodiment, before the second partial frame HF2 is started, the masking enable signal MS_EN in the back porch period BPP of the first partial frame HF1 may be changed to a level corresponding to the first voltage VGH. However, the disclosure is not limited thereto. Alternatively, the masking enable signal MS_EN may be changed to a level corresponding to the first voltage VGH in the front porch period FPP of the second partial frame HF2.

Referring to FIGS. 4, 8A, 8B and 9C, during the (p−1)-th partial frame HFp−1, the pixels positioned in the second display area DA2 may not display an image. During the (p−1)-th partial frame HFp−1, a (p−2)-th non-fixed data signal Dnfp−2 may be supplied to pixels positioned in the second display area DA2.

The masking enable signal MS_EN supplied to the carry circuit CRk−1 during the (p−1)-th partial frame HFp−1 has a same level as the first voltage VGH. Accordingly, even though the second carry control signal CCSk−1b is applied to the carry circuit CRk−1 and then the second carry transistor C_TR2 is turned on, the carry signal CSk−1 has a voltage level (i.e., a voltage level corresponding to the first voltage VGH) corresponding to the masking enable signal MS_EN. That is, as the carry signal CSk−1 is maintained in an inactive state, the k-th emission control signal EMk is not activated, and thus the light emitting elements ED (see FIG. 6) included in the k-th row of pixels maintain a turn-off (ED_OFF) state. Accordingly, even though the (p−2)-th non-fixed data signal Dnfp−2 is supplied to the k-th row of pixels, an image corresponding to the (p−2)-th non-fixed data signal Dnfp−2 is not displayed in the second display area DA2.

However, as the non-fixed data signals Dnf1, Dnf2, and Dnfp−2, each of which is different from the black data signal Db, are applied to pixels positioned in the second display area DA2 during the partial frames HF2 to HFp−1, a potential difference between the first and second electrodes of the first transistor T1 (see FIG. 6) of each pixel may not be fixed to a constant value. As the non-fixed data signals Dnf1, Dnf2, and Dnfp−2 are changed in units of at least one partial frame, during the second to (p−1)-th partial frames HF2 to HFp−1, the potential difference between the first and second electrodes of the first transistor T1 of each pixel may not be fixed to a constant value.

Accordingly, in the second mode, a hysteresis characteristic change of the first transistor T1 provided in pixels of the second display area DA2 may be effectively prevented. Accordingly, an image displayed in the second display area DA2 may be effectively prevented from being distorted after the second mode is switched to the first mode.

Before the p-th partial frame HFp is started, the masking enable signal MS_EN may be changed to a level corresponding to the second voltage VGL in the back porch period BPP of the (p−1)-th partial frame HFp−1. However, the disclosure is not limited thereto. Alternatively, the masking enable signal MS_EN may be changed to a level corresponding to the second voltage VGL in the front porch period FPP of the p-th partial frame HFp.

Referring to FIGS. 4, 8A, 8B and 9D, during the p-th partial frame HFp, the pixels positioned in the second display area DA2 may not display an image. During the p-th partial frame HFp, the black data signal Db may be supplied to pixels positioned in the second display area DA2.

Before the active period AP of the p-th partial frame HFp is started, the masking enable signal MS_EN is already switched from the first voltage VGH to the second voltage VGL. Accordingly, when the second carry control signal CCSk−1 b is applied to the carry circuit CRk−1 and then the second carry transistor C_TR2 is turned on, the carry signal CSk−1 has a voltage level (i.e., a voltage level corresponding to the second voltage VGL) corresponding to the masking enable signal MS_EN. That is, as the carry signal CSk−1 is switched to an activated state, the k-th emission control signal EMk may be activated. Accordingly, the light emitting elements ED (see FIG. 6) included in pixels positioned in the second display area DA2 may be turned on (ED_ON). Accordingly, the black image BIM corresponding to the black data signal Db may be displayed in the second display area DA2.

In an embodiment, as described above, the black image BIM is displayed during the first and p-th partial frames HF1 and HFp, such that an operation in which the light emitting elements ED are turned off in the second to (p−1)-th partial frames HF2 to HFp−1 may not be perceived.

Figure 10A:
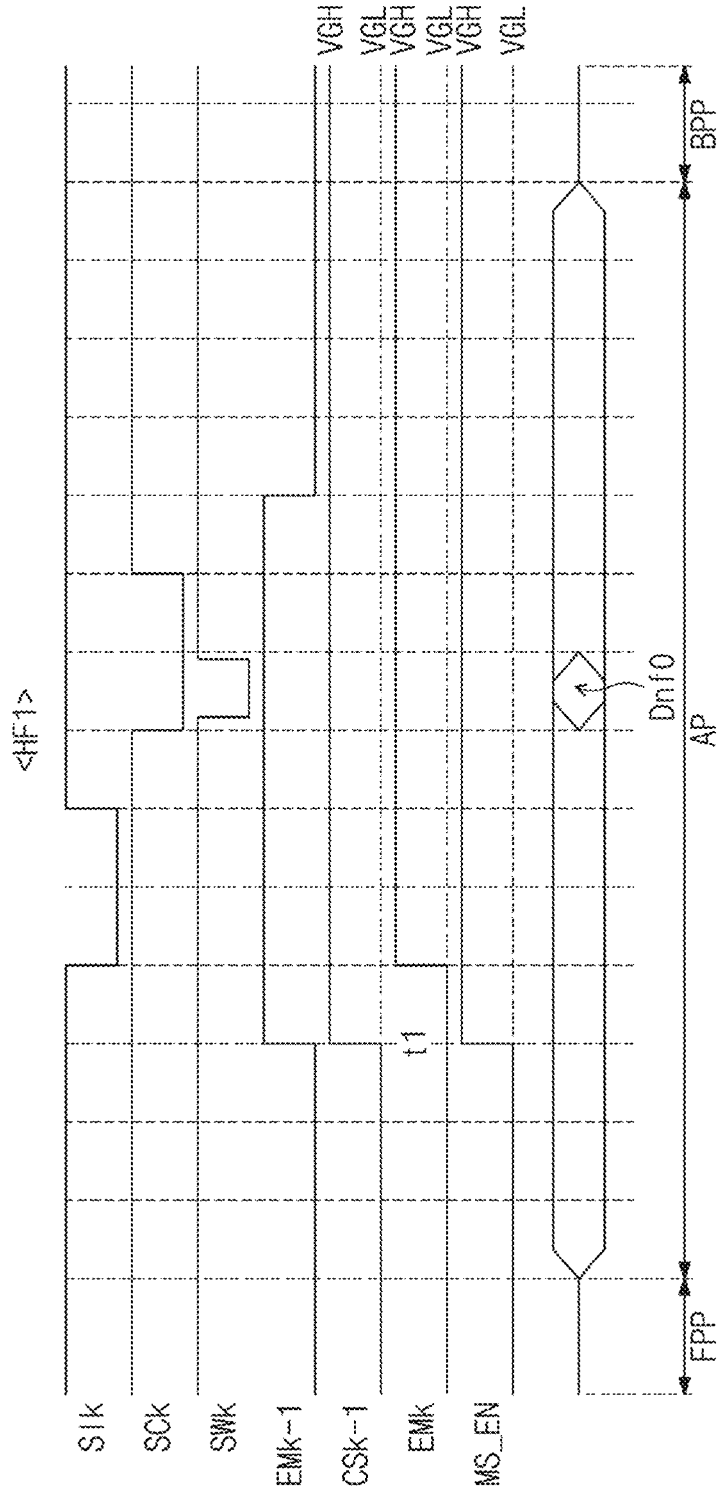
FIGS. 10A and 10B are waveform diagrams for describing operations of a light emitting driver and a scan driver in a second mode, according to an embodiment of the disclosure.
Figure 10B:
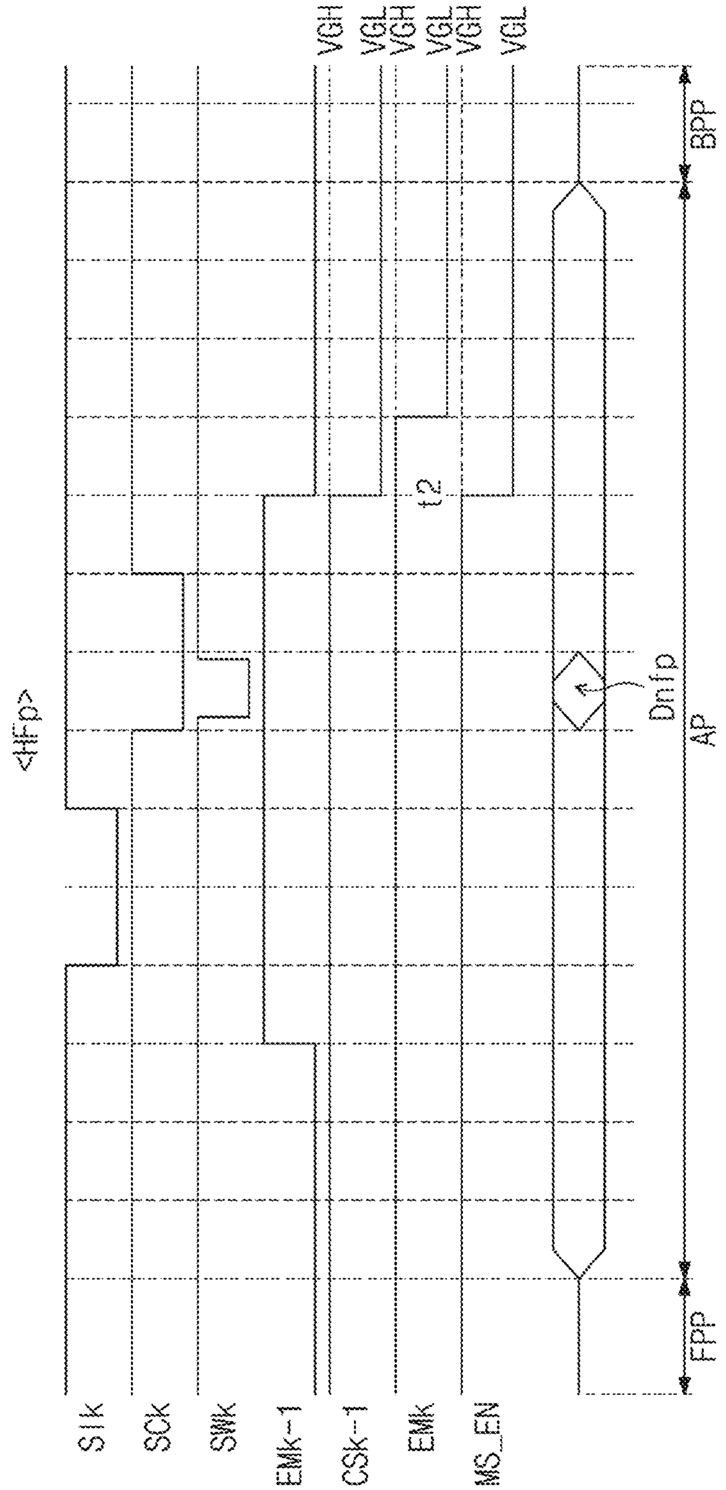

FIG. 10A is a waveform diagram for describing operations of a light emitting driver and a scan driver in a first partial frame, according to an embodiment of the disclosure. FIG. 10B is a waveform diagram for describing operations of a light emitting driver and a scan driver in a p-th partial frame, according to an embodiment of the disclosure.

Referring to FIGS. 4, 10A, and 10B, during at least one frame among the first and p-th partial frames HF1 and HFp, a non-fixed data signal may be written in pixels of the second display area DA2. That is, when it is desired to display the black image BIM in the first partial frame HF1 that enters a second mode or the last partial frame HFp immediately before the second mode is ended, non-fixed data signals Dnf0 and Dnfp may be supplied to pixels of the second display area DA2 instead of the black data signal Db.

Referring to FIG. 10A, a non-fixed data signal Dnf0 may be supplied to pixels in the k-th row during the first partial frame HF1.

At a point in time t1 at which the carry signal CSk−1 is deactivated, the masking enable signal MS_EN supplied to the carry circuit CRk−1 may be changed to the first voltage VGH. Accordingly, even though the second carry control signal CCSk−1b is applied to the carry circuit CRk−1 and the masking enable signal MS_EN is output as the carry signal CSk−1, the carry signal CSk−1 is maintained at the first voltage VGH. That is, because the carry signal CSk−1 is maintained in an inactive state by the masking enable signal MS_EN, the light emitting elements ED (see FIG. 6) included in pixels positioned in the second display area DA2 may be turned off (ED_OFF) during the first partial frame HF1. Accordingly, even though the non-fixed data signal Dnf0 is supplied to the pixels of the second display area DA2 during the first partial frame HF1, the image may not be displayed in the second display area DA2.

Referring to FIG. 10B, the non-fixed data signal Dnfp may be supplied to the k-th row of pixels during the p-th partial frame HFp.

At a point in time t2 when the (k−1)-th emission control signal EMk−1 is activated, the masking enable signal MS_EN supplied to the carry circuit CRk−1 may be changed to the second voltage VGL. Accordingly, when the second carry control signal CCSk−1b is applied to the carry circuit CRk−1 and the masking enable signal MS_EN is output as the carry signal CSk−1, the carry signal CSk−1 may have a level corresponding to the second voltage VGL. That is, at a point in time t2, the carry signal CSk−1 is switched to an activated state in response to the masking enable signal MS_EN. However, the disclosure is not limited thereto. Alternatively, the masking enable signal MS_EN may be changed to the second voltage VGL in the p-th partial frame HFp of the back porch period BPP.

Figure 11A:
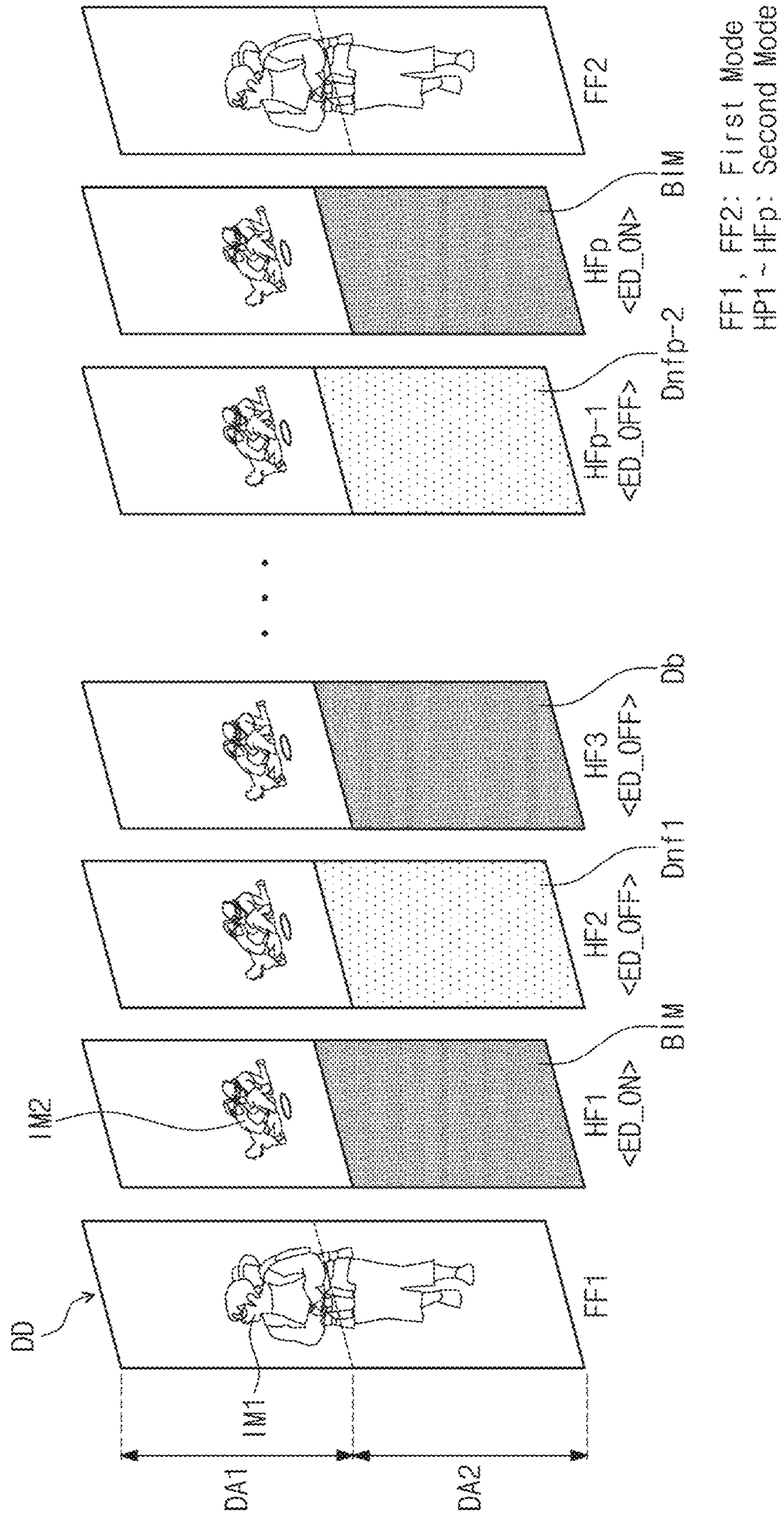
FIGS. 11A and 11B are diagrams for describing an operation of a display device, according to embodiments of the disclosure.
Figure 11B:
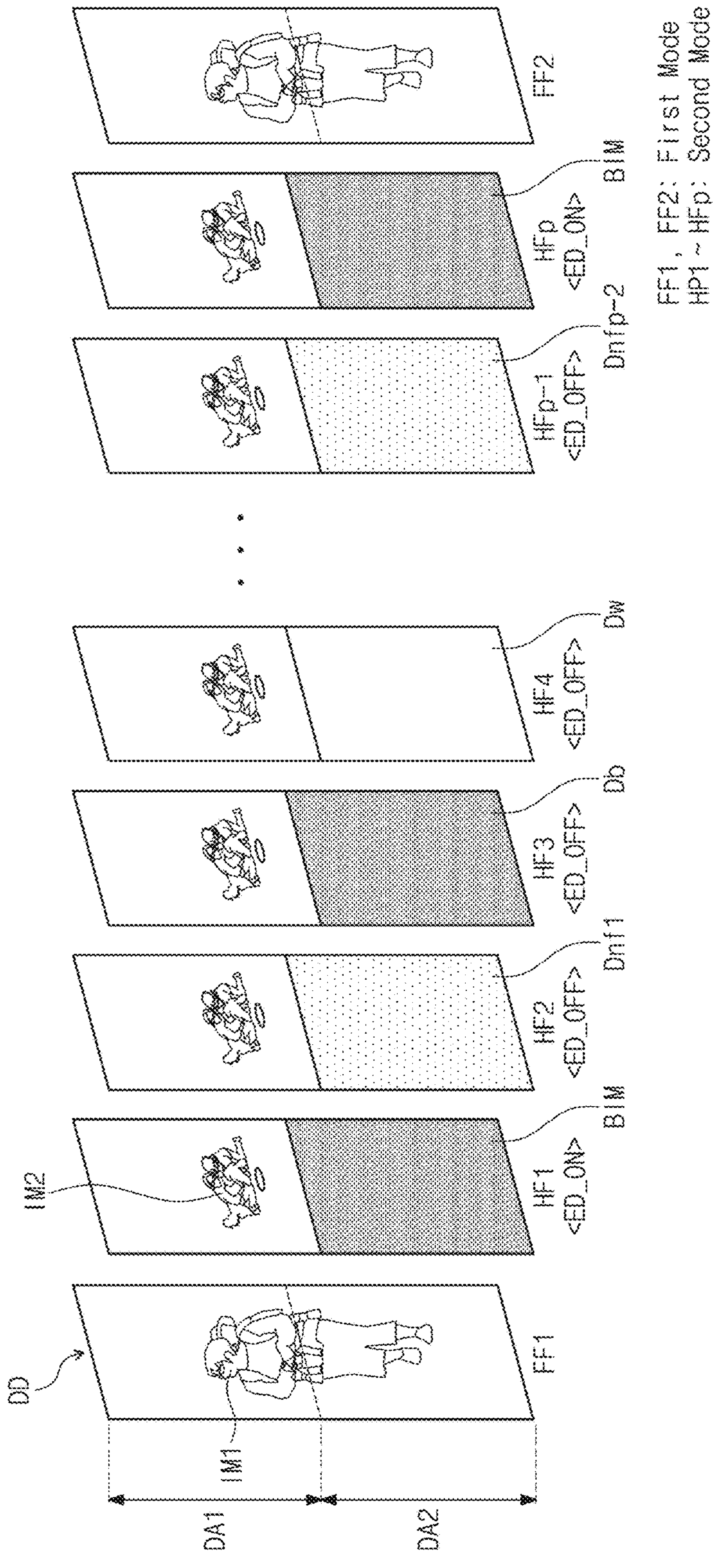

FIGS. 11A and 11B are diagrams for describing an operation of a display device, according to embodiments of the disclosure. The same reference numerals are given to the same components as those shown in FIG. 4 among the components shown in FIGS. 11A and 11B, and thus any repetitive detailed description thereof will be omitted to avoid redundancy.

Referring to FIG. 11A, after a first mode is switched to a second mode, during the initial (or start) partial frame HF1 (i.e., the first partial frame), the second display area DA2 may display the black image BIM, and, during the last partial frame HFp (i.e., the p-th partial frame) immediately before exiting the second mode, the second display area DA2 may display the black image BIM.

During at least one partial frame among the second to (p−1)-th partial frames HF2 to HFp−1, a non-fixed data signal may be supplied to pixels of the second display area DA2. The non-fixed data signal may be a data signal corresponding to one of a plurality of specific images. In an embodiment of the disclosure, in the second mode, during the second partial frame HF2, the first non-fixed data signal Dnf1 corresponding to one of the plurality of specific images is supplied to pixels of the second display area DA2. During the (p−1)-th partial frame HFp−1, the (p−2)-th non-fixed data signal Dnfp−2 corresponding to one of the plurality of specific images is supplied to pixels of the second display area DA2. During the second and (p−1)-th partial frames HF2 and HFp−1, the light emitting element ED of the pixels PX positioned in the second display area DA2 may be turned off (ED_OFF). Accordingly, during the second and (p−1)-th partial frames HF2 and HFp−1, images corresponding to the first non-fixed data signal Dnf1 and the (p−2)-th non-fixed data signal Dnfp−2 may not be displayed in the second display area DA2.

In an embodiment, during at least one partial frame among the second to (p−1)-th partial frames HF2 to HFp−1, the black data signal Db may be supplied to pixels of the second display area DA2. In an embodiment of the disclosure, during the third partial frame HF3, the black data signal Db may be supplied to pixels of the second display area DA2. During the third partial frame HF3, the light emitting element ED of the pixels PX positioned in the second display area DA2 may be turned off (ED_OFF). Accordingly, during the third partial frame HF3, an image corresponding to the black data signal Db may not be displayed in the second display area DA2.

In such an embodiment, as described above, the non-fixed data signals Dnf1 and Dnfp−2 and the black data signal Db are alternately applied to the pixels PX of the second display area DA2 during the second to (p−1)-th partial frames HF2 to HFp−1, such that a change in the hysteresis characteristic of the first transistor T1 (see FIG. 6) provided in each pixel may be effectively prevented. Accordingly, an image displayed in the second display area DA2 may be effectively prevented from being distorted after the second mode is switched to the first mode.

Referring to FIG. 11B, after entering the second mode, the second display area DA2 may display the black image BIM during the initial (or start) partial frame HF1 (i.e., the first partial frame), and the second display area DA2 may display the black image BIM during the last partial frame HFp (i.e., the p-th partial frame) immediately before exiting the second mode.

In the second mode, during at least one partial frame among the second to (p−1)-th partial frames HF2 to HFp−1, the non-fixed data signals Dnf1 and Dnfp−2 may be supplied to the pixels PX of the second display area DA2. In the second mode, during at least one partial frame among the second to (p−1)-th partial frames HF2 to HFp−1, the black data signal Db may be supplied to the pixels PX of the second display area DA2. In the second mode, during at least one partial frame among the second to (p−1)-th partial frames HF2 to HFp−1, a white data signal Dw may be supplied to the pixels PX of the second display area DA2. The black data signal Db may have a black grayscale, and the white data signal Dw may have a white grayscale.

In an embodiment of the disclosure, during the third partial frame HF3, the pixels PX of the second display area DA2 may receive the black data signal Db. During the fourth partial frame HF4, the pixels PX of the second display area DA2 may receive the white data signal Dw. A partial frame, in which the black data signal Db is applied, and a partial frame, in which the white data signal Dw is applied, may be disposed adjacent to each other. During the third and fourth partial frames HF3 and HF4, the light emitting elements ED of the pixels PX positioned in the second display area DA2 may be turned off (ED_OFF). Accordingly, during the third partial frame HF3, an image corresponding to the black data signal Db is not displayed in the second display area DA2. During the fourth partial frame HF4, an image corresponding to the white data signal Dw is not displayed in the second display area DA2.

In such an embodiment, as described above, the non-fixed data signals Dnf1 and Dnfp−2, the black data signal Db, and the white data signal Dw are alternately applied to the pixels PX of the second display area DA2 during the second to (p−1)-th partial frames HF2 to HFp−1, such that a change in the hysteresis characteristic of the first transistor T1 (see FIG. 6) provided in each pixel may be prevented. Accordingly, an image displayed in the second display area DA2 may be prevented from being distorted after the second mode is switched to the first mode.

Figure 12:
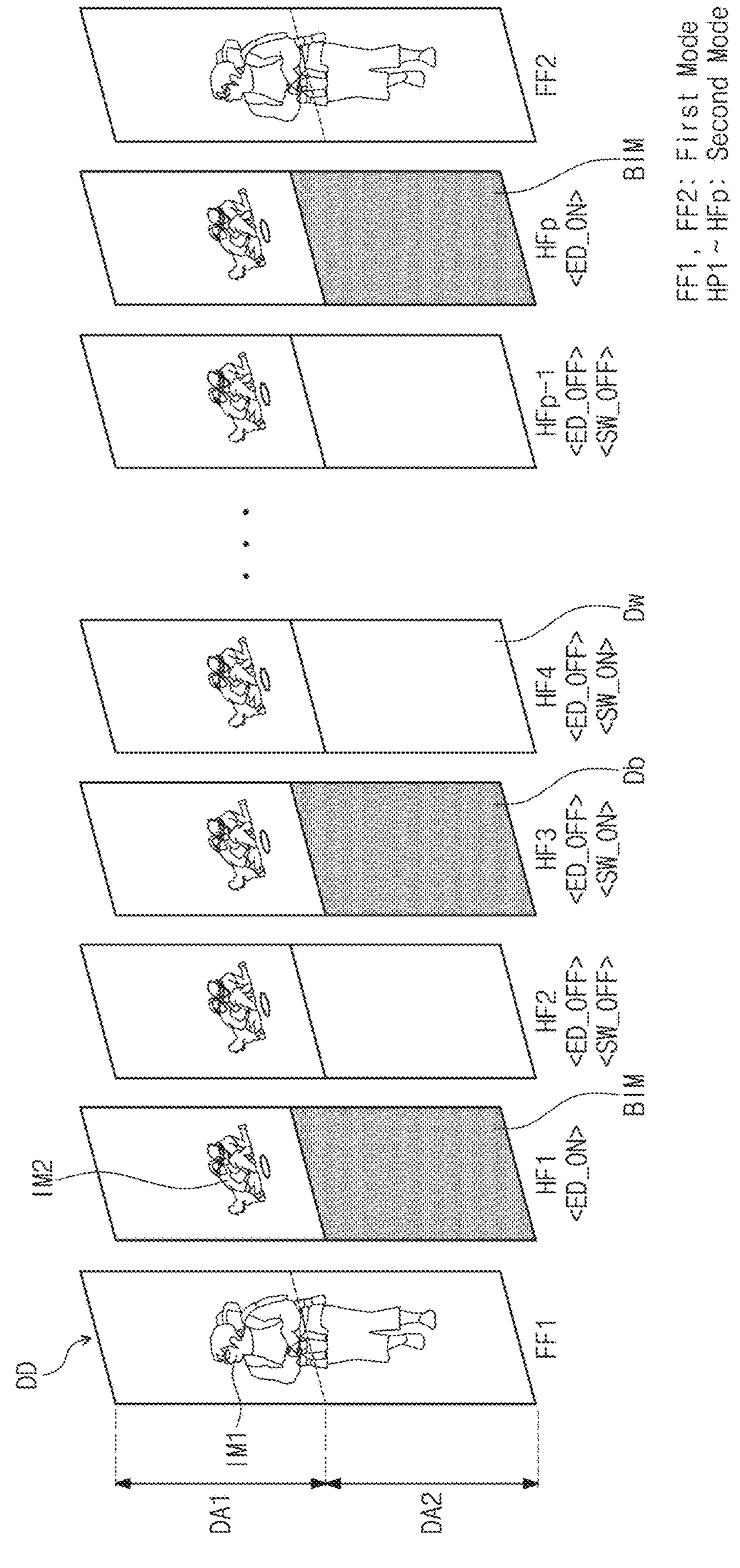
FIG. 12 is a diagram for describing an operation of a display device, according to an embodiment of the disclosure.
Figure 13A:
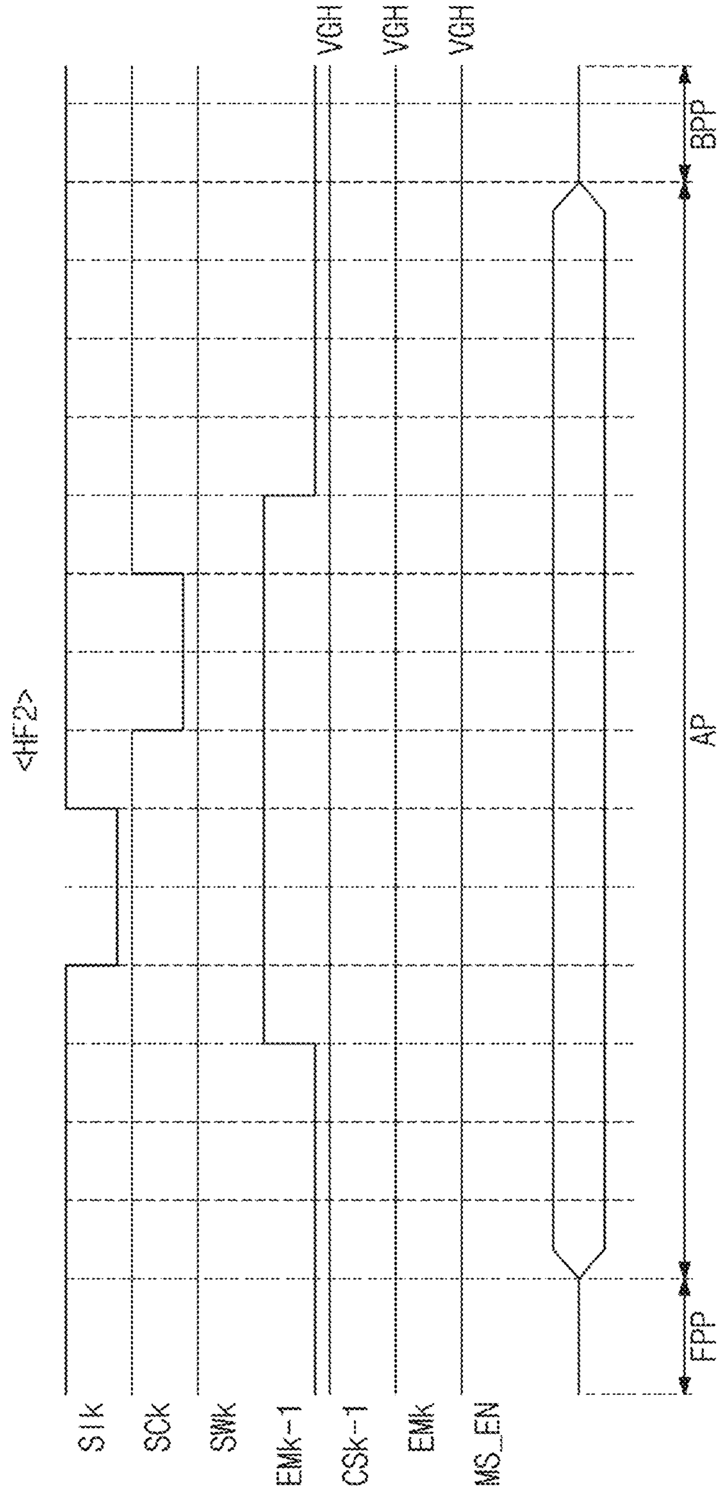
FIG. 13A is a waveform diagram for describing operations of a light emitting driver and a scan driver in the second partial frame shown in FIG. 12.
Figure 13B:
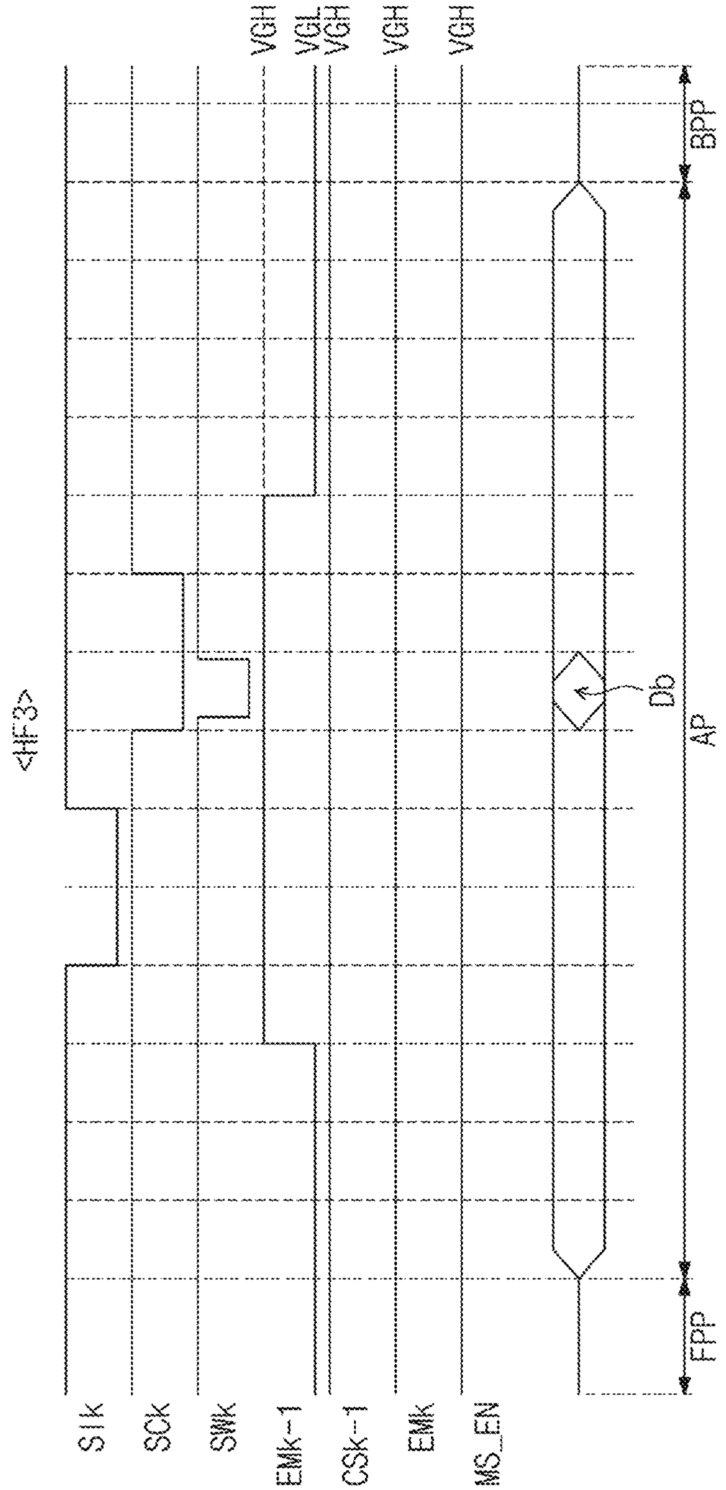
FIG. 13B is a waveform diagram for describing operations of a light emitting driver and a scan driver in the third partial frame shown in FIG. 12.
Figure 13C:
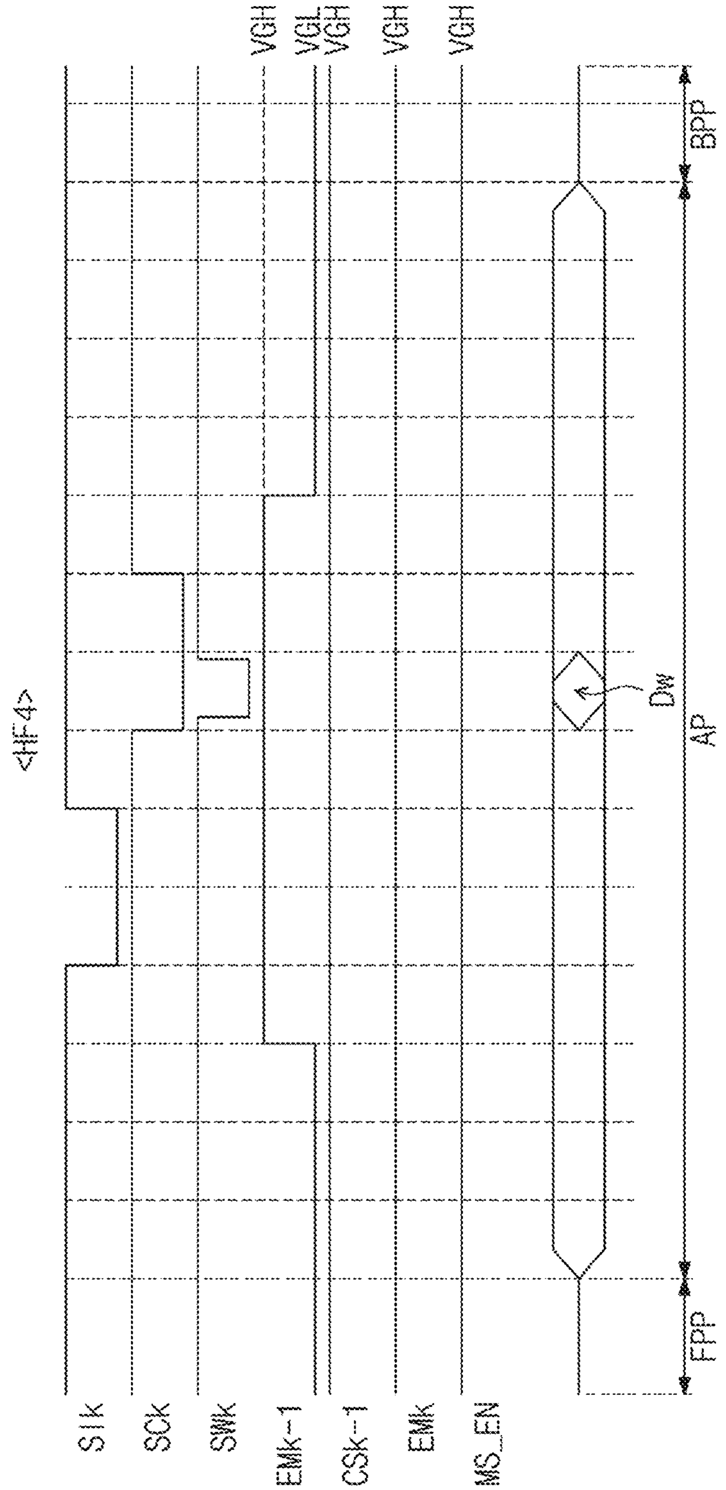
FIG. 13C is a waveform diagram for describing operations of a light emitting driver and a scan driver in the fourth partial frame shown in FIG. 12.

FIG. 12 is a diagram for describing an operation of a display device, according to an embodiment of the disclosure. FIG. 13A is a waveform diagram for describing operations of a light emitting driver and a scan driver in the second partial frame shown in FIG. 12. FIG. 13B is a waveform diagram for describing operations of a light emitting driver and a scan driver in the third partial frame shown in FIG. 12. FIG. 13C is a waveform diagram for describing operations of a light emitting driver and a scan driver in the fourth partial frame shown in FIG. 12.

The same reference numerals are given to the same components as those shown in FIG. 11B among the components shown in FIG. 12, and thus any repetitive detailed description thereof will be omitted to avoid redundancy.

Referring to FIG. 12, after entering the second mode, the second display area DA2 may display the black image BIM during the initial (or start) partial frame HF1 (i.e., the first partial frame), and the second display area DA2 may display the black image BIM during the last partial frame HFp (i.e., the p-th partial frame) immediately before exiting the second mode.

In the second mode, during at least one partial frame among the second to (p−1)-th partial frames HF2 to HFp−1, a data signal may not be written in the pixels PX of the second display area DA2. In an embodiment of the disclosure, in the second mode, a data signal is not written in the pixels PX of the second display area DA2 during the second partial frame HF2, and a data signal is not written in the pixels PX of the second display area DA2 during the (p−1)-th partial frame HFp−1. During the second and (p−1)-th partial frames HF2 and HFp−1, the second transistor T2 (see FIG. 6) of pixels PX positioned in the second display area DA2 may be turned off (SW OFF) as well as the light emitting element ED of the pixels PX disposed in the second display area DA2 is turned off (ED_OFF).

Referring to FIGS. 12 and 13A, during the second partial frame HF2, the k-th write scan signal SWk may not be activated. When the k-th write scan signal SWk is not activated, the second transistor T2 (see FIG. 6) may not be turned on, and thus a data signal may not be written in the pixels PX of the second display area DA2.

Referring to FIGS. 12, 13B, and 13C, in the second mode, during at least one partial frame among the second to (p−1)-th partial frames HF2 to HFp−1, the black data signal Db or the white data signal Dw may be written in the pixels PX of the second display area DA2. In an embodiment of the disclosure, during the third partial frame HF3, the black data signal Db may be written in the pixels PX of the second display area DA2. During the fourth partial frame HF4, the white data signal Dw may be written in the pixels PX of the second display area DA2. The k-th write scan signal SWk is activated during the third and fourth partial frames HF3 and HF4, and thus the second transistor T2 (see FIG. 6) is also turned on (SW ON). Accordingly, the black and white data signals Db and Dw may be written in the pixels PX of the second display area DA2 during the third and fourth partial frames HF3 and HF4, respectively. However, the light emitting elements ED of the pixels PX positioned in the second display area DA2 may be turned off (ED_OFF) during the third and fourth partial frames HF3 and HF4, and thus the written black and white data signals Db and Dw may not be displayed as images.

In such an embodiment, as described above, the black data signal Db and the white data signal Dw are alternately applied during at least one partial frame among the second to (p−1)-th partial frames HF2 to HFp−1, such that a change in the hysteresis characteristic of the first transistor T1 (see FIG. 6) provided in each pixel may be effectively prevented. Accordingly, an image displayed in the second display area DA2 may be effectively prevented from being distorted after the second mode is switched to the first mode.

Figure 14:
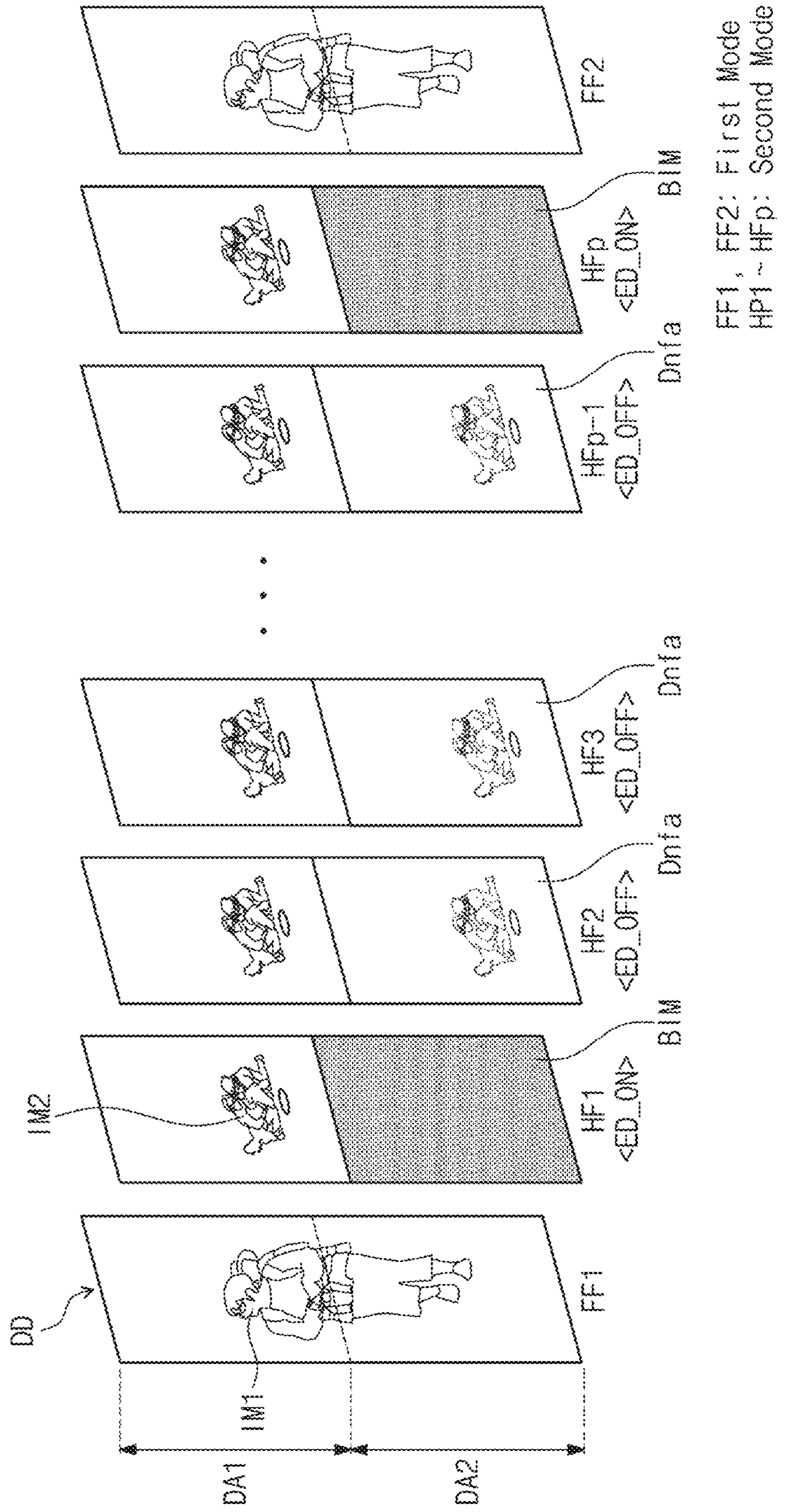
FIG. 14 is a diagram for describing an operation of a display device, according to an embodiment of the disclosure.

FIG. 14 is a diagram for describing an operation of a display device, according to an embodiment of the disclosure. The same reference numerals are given to the same components as those shown in FIG. 4 among the components shown in FIG. 14, and thus any repetitive detailed description thereof will be omitted to avoid redundancy.

Referring to FIG. 14, after entering the second mode, the second display area DA2 may display the black image BIM during the initial (or start) partial frame HF1 (i.e., the first partial frame), and the second display area DA2 may display the black image BIM during the last partial frame HFp (i.e., the p-th partial frame) immediately before exiting the second mode.

In the second mode, during at least one partial frame among the second to (p−1)-th partial frames HF2 to HFp−1, the second display area DA2 may receive a non-fixed data signal Dnfa. The non-fixed data signal Dnfa may be a data signal corresponding to an image displayed in the first display area DA1. That is, the data signal applied to the first display area DA1 may be copied as it is and then may be written as the non-fixed data signal Dnfa in the second display area DA2. In such an embodiment, a memory for storing a data signal applied to the first display area DA1 may be additionally included in the display device. During the second and (p−1)-th partial frames HF2 and HFp−1, the light emitting element ED of the pixels PX positioned in the second display area DA2 may be turned off (ED_OFF).

Accordingly, even when the non-fixed data signal Dnfa is written in the second display area DA2, the non-fixed data signal Dnfa may not be displayed as an image in the second display area DA2.

Unfixed data signals may be written in the pixels PX in the second display area DA2 as an image displayed in the first display area DA1 is continuously changed.

In such an embodiment, the non-fixed data signal Dnfa is applied during the second to (p−1)-th partial frames HF2 to HFp−1, such that a change in the hysteresis characteristic of the first transistor T1 (see FIG. 6) provided in each pixel may be effectively prevented. Accordingly, an image displayed in the second display area DA2 may be effectively prevented from being distorted after the second mode is switched to the first mode.

Figure 15A:
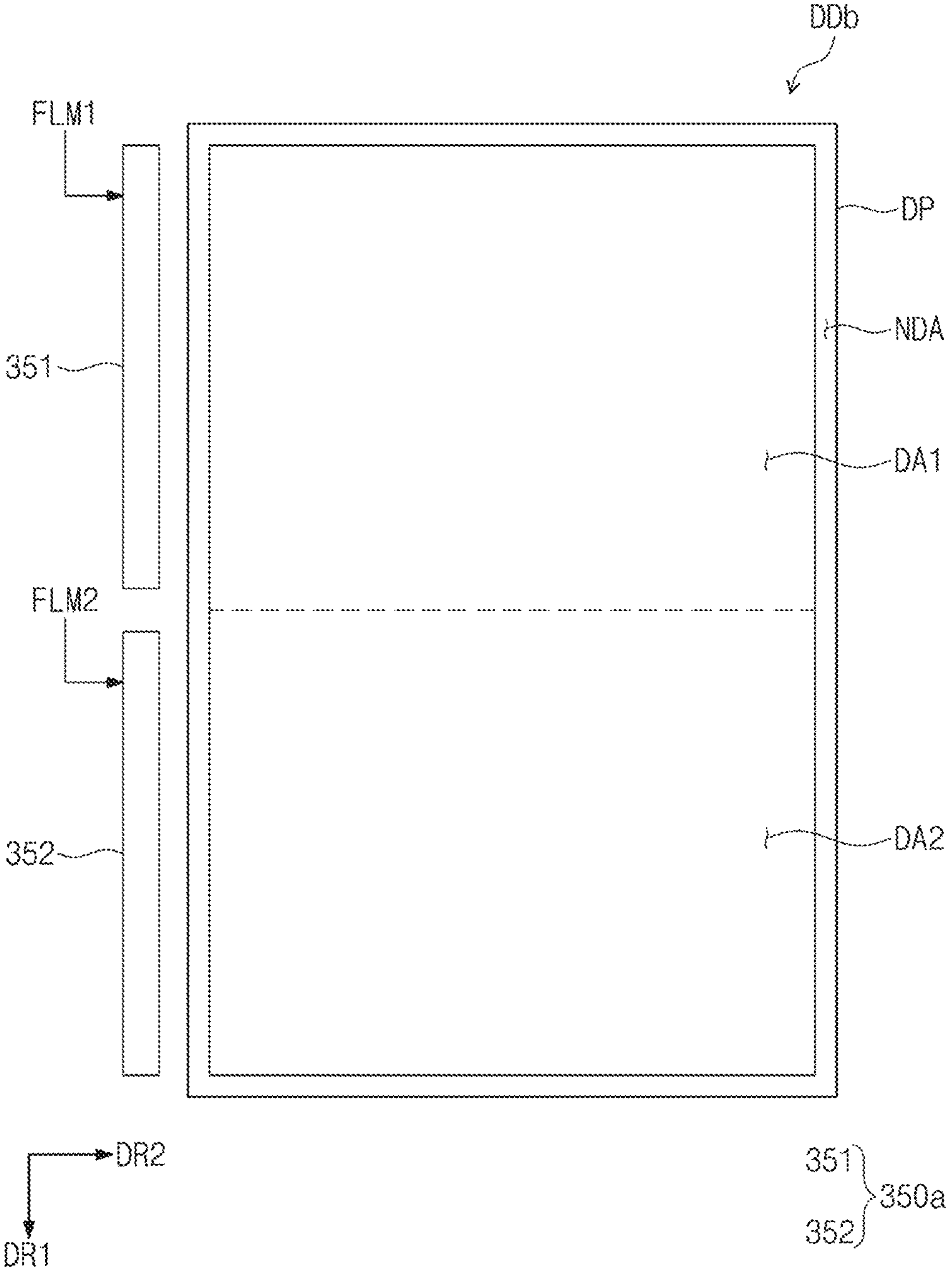
FIGS. 15A to 15C are plan views of display devices, according to embodiments of the disclosure.
Figure 15B:
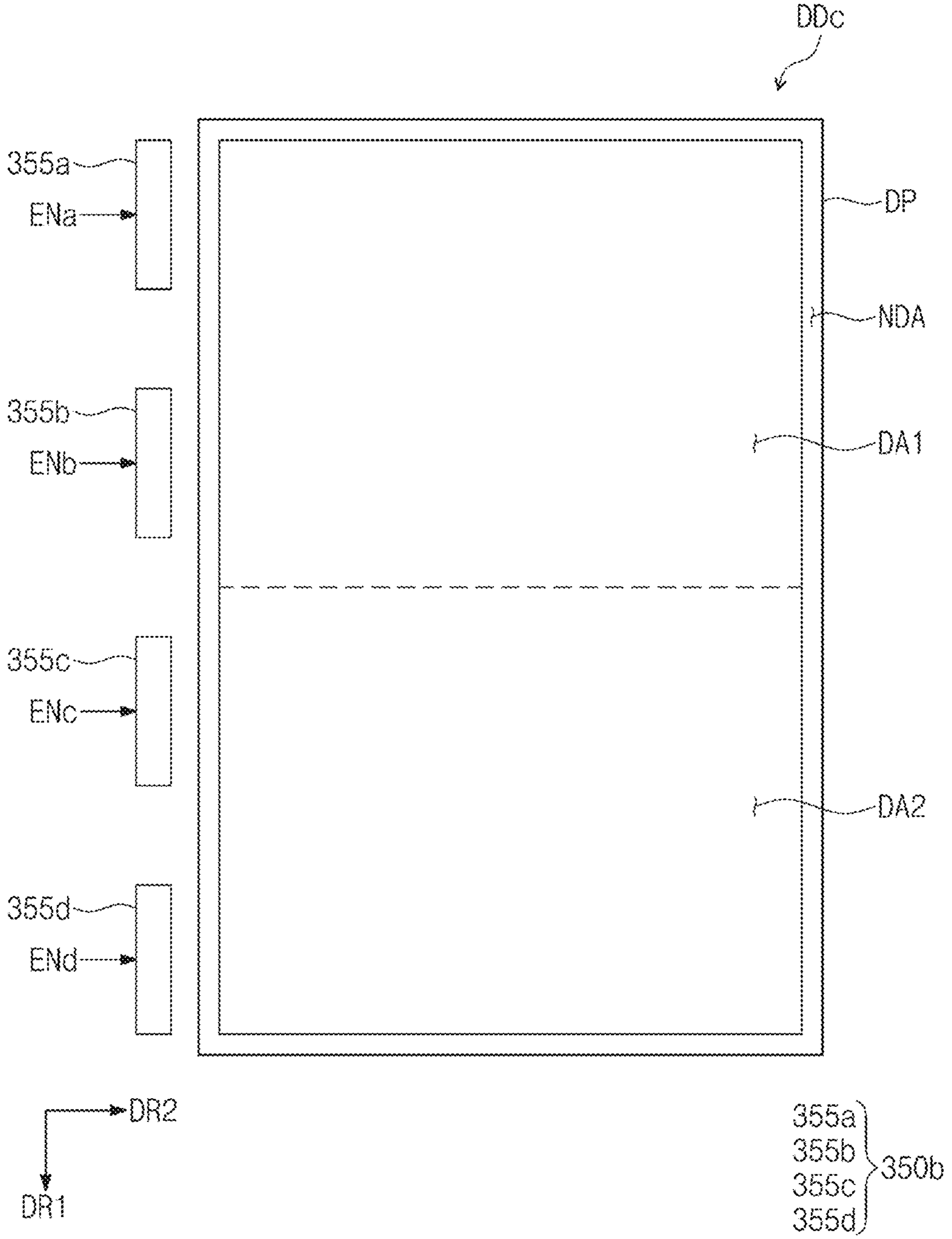
Figure 15C:
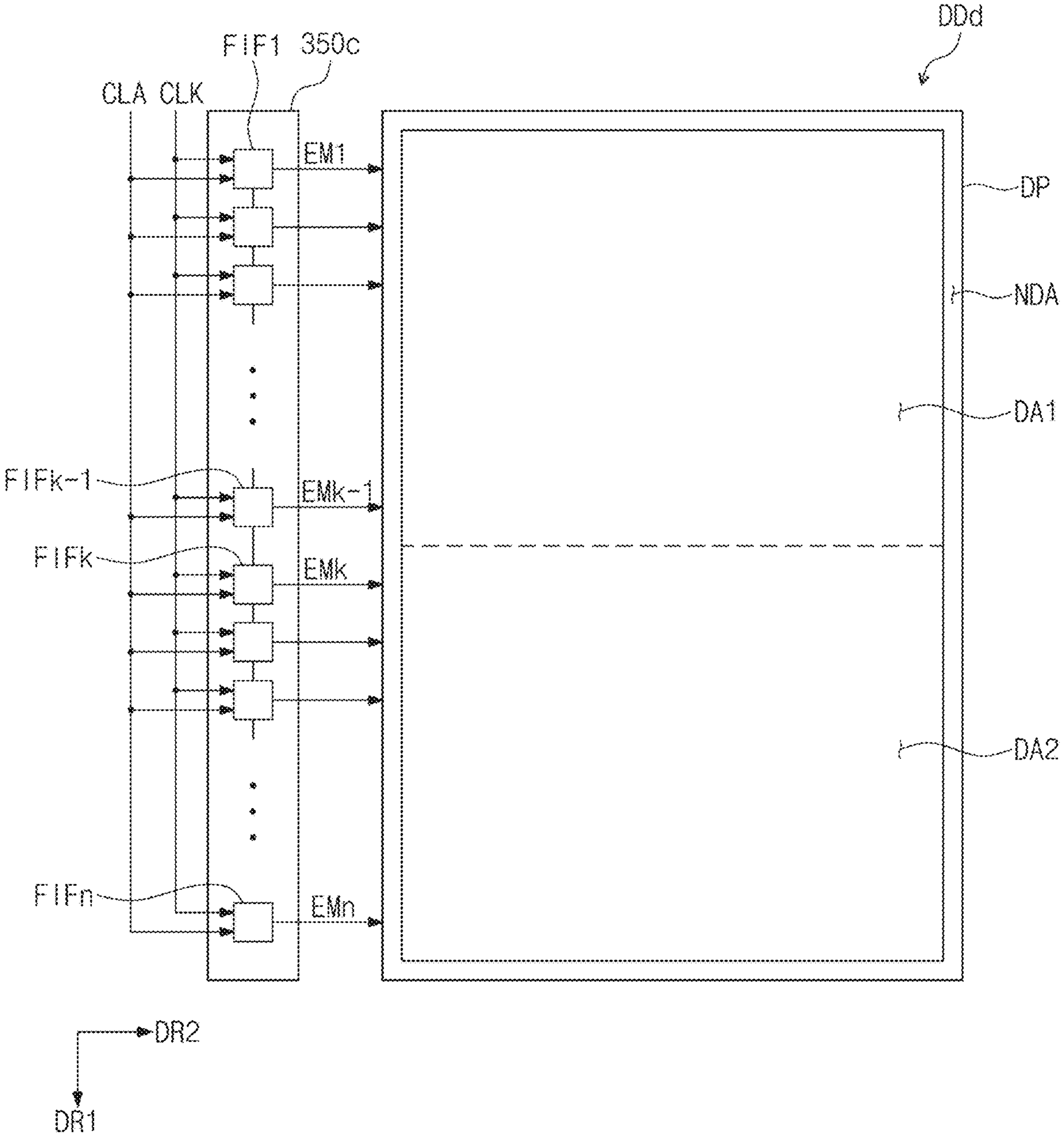

FIGS. 15A to 15C are plan views of display devices, according to embodiments of the disclosure.

Referring to FIGS. 4 and 15A, an embodiment of a display device DDb may include the display panel DP and a light emitting driver 350*a*. In such an embodiment, the light emitting driver 350*a* may include a first light emitting driver 351 positioned to correspond to the first display area DA1 and a second light emitting driver 352 positioned to correspond to the second display area DA2. The first light emitting driver 351 may include a plurality of first sub stages that are connected dependently to each other. However, the disclosure is not limited thereto. In an embodiment, the first light emitting driver 351 may include a plurality of chips. The first light emitting driver 351 may receive a first start signal FLM1 from the driving controller 100 illustrated in FIG. 5.

The second light emitting driver 352 may include a plurality of second sub stages that are connected dependently to each other. However, the disclosure is not limited thereto. In an embodiment, the second light emitting driver 352 may include a plurality of chips. The second light emitting driver 352 may receive a second start signal FLM2 from the driving controller 100 illustrated in FIG. 5.

In the first mode, both the first and second start signals FLM1 and FLM2 may be activated. The first start signal FLM1 may be activated in a second mode. However, in the second mode, during at least one partial frame among the first to p-th partial frame HF1 to HFp, the second start signal FLM2 may be deactivated. In an embodiment of the disclosure, during the first and p-th partial frames HF1 to HFp in which a light emitting element is turned on (ED_ON), the second start signal FLM2 may be activated. During the second to (p−1)-th partial frames HF2 to HFp−1 in which a light emitting element is turned off (ED_OFF), the second start signal FLM2 may be maintained in an inactive state.

Referring to FIGS. 4 and 15B, an alternative embodiment of a display device DDc may include the display panel DP and a light emitting driver 350*b*. In such an embodiment, the light emitting driver 350*b* may include first and second chips 355*a* and 355*b* positioned to correspond to (or disposed adjacent to a side of) the first display area DA1 and may include third and fourth chips 355*c* and 355*d* positioned to correspond to (or disposed adjacent to a side of) the second display area DA2. The number of the chips positioned to correspond to the first display area DA1 is not limited thereto shown in FIG. 15B. The number of the chips positioned to correspond to the second display area DA2 is not limited thereto shown in FIG. 15B. The number of the chips may vary depending on a size of the corresponding display area.

The first to fourth chips 355*a*, 355*b*, 355*c*, and 355*d* may receive first to fourth enable signals ENa, ENb, ENc, and ENd, respectively. Each of the first to fourth chips 355*a*, 355*b*, 355*c*, and 355*d* may be activated or deactivated depending on the first to fourth enable signals ENa, ENb, ENc, and ENd. When each of the first to fourth enable signals ENa, ENb, ENc, and ENd includes an activation code, the corresponding chip may be activated. When each of the first to fourth enable signals ENa, ENb, ENc, and ENd includes a deactivation code, the corresponding chip may be deactivated. Each of the first to fourth chips may further include a decoder for decoding a code of a corresponding enable signal.

In the first mode, the first to fourth chips 355*a*, 355*b*, 355*c*, and 355*d* may be activated. In the second mode, the first and second chips 355*a* and 355*b* may be activated. However, in the second mode, during at least one partial frame among the first to p-th partial frame HF1 to HFp, the third and fourth chips 355*c* and 355*d* may be deactivated. In an embodiment of the disclosure, during the first and p-th partial frames HF1 and HFp in which a light emitting element is turned on (ED_ON), the third and fourth chips 355*c* and 355*d* may be activated. On the other hand, during the second to (p−1)-th partial frames HF2 to HFp−1 in which a light emitting element is turned off (ED_OFF), the third and fourth chips 355*c* and 355*d* may be maintained in an inactive state.

Referring to FIGS. 4 and 15C, another alternative embodiment of a display device DDd may include the display panel DP and a light emitting driver 350*c*. In such an embodiment, the light emitting driver 350*c* may include a plurality of flip-flops constituting a shift register. In an embodiment of the disclosure, the light emitting driver 350*c* includes a first to n-th flip-flops FIF1 to FIFn. Here, the first to (k−1)-th flip-flops FIF1 to FIFk−1 are positioned to correspond to the first display area DA1, and the k-th to n-th flip-flops FIFk to FIFn are positioned to correspond to the second display area DA2.

The first to n-th flip-flops FIF1 to FIFn may output the first to n-th emission control signals EM1 to EMn. In such an embodiment, each of the first to n-th emission control signals EM1 to EMn may be provided as an input signal of the next flip-flop.

Each of the first to n-th flip-flops FIF1 to FIFn may receive a clock signal CLK and a clear signal CLA from the driving controller 100 illustrated in FIG. 5. It may be determined whether an output of each of the first to n-th flip-flops FIF1 to FIFn becomes 0 or 1, depending on the clear signal CLA. In the first mode, the clear signal CLA may be maintained at 1. During at least one partial frame among the first to p-th partial frames HF1 to HFp of the second mode, the clear signal CLA may be switched to 0. In an embodiment of the disclosure, during the first and p-th partial frames HF1 and HFp, the clear signal CLA may be maintained as 1. During the second to (p−1)-th partial frames HF2 to HFp−1, the clear signal CLA may be switched to 0 at a point in time when the k-th flip-flop FIFk operates. When the clear signal CLA is 0, an output of each of the k-th to n-th flip-flops FIFk to FIFn may be maintained as 0. Accordingly, during the second to (p−1)-th partial frames HF2 to HFp−1, light emitting elements included in pixels of the second display area DA2 may be turned off (ED_OFF).

According to embodiments of the disclosure, by supplying the non-fixed data signal to the pixels of the second display area in the second mode, the hysteresis characteristic change of the first transistor included in each pixel may be effectively prevented. Accordingly, it is possible to prevent distortion of an image displayed on the second display area by the first transistor after the second mode is switched to the first mode.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
- a display panel including a first display area and a second display area;
- a data driver which outputs a plurality of data signals to the display panel;
- a scan driver which outputs a plurality of scan signals to the display panel; and
- a light emitting driver which outputs a plurality of emission control signals to the display panel,
- wherein the display panel displays a first image on the first display area and the second display area in a first mode, and displays a second image on the first display area in a second mode, and
- wherein the light emitting driver
- activates the plurality of emission control signals applied to the first display area and the second display area in the first mode,
- maintains emission control signals applied to the second display area among the plurality of emission control signals in a deactivation state during at least one partial frame in the second mode.

2. The display device of claim 1, wherein the light emitting driver
- activates the emission control signals applied to the second display area during a first partial frame in the second mode, and
- maintains the emission control signals applied to the second display area in the deactivation state during a plurality of second partial frame in the second mode,
- wherein the data driver
- supplies a bias data signal to the second display area during the first partial frame, and
- supplies a non-fixed data signal different from the bias data signal to the second display area during at least one partial frame among the plurality of second partial frames.

3. The display device of claim 2, wherein the bias data signal is a black data signal having a black grayscale.

4. The display device of claim 2, wherein the non-fixed data signal is a data signal corresponding to a specific image.

5. The display device of claim 2, wherein the plurality of second partial frames include:
- a plurality of first intermediate partial frames in which a data signal corresponding to a specific image is supplied; and
- a second intermediate partial frame, which is adjacent to one of the plurality of first intermediate partial frames and in which a grayscale data signal having a specific grayscale is supplied.

6. The display device of claim 5, wherein the second intermediate partial frame includes:
- a first grayscale partial frame in which a first grayscale data signal having a first grayscale is supplied; and
- a second grayscale partial frame in which a second grayscale data signal having a second grayscale different from the first grayscale is supplied.

7. The display device of claim 2, wherein the plurality of second partial frames include:
- a plurality of first grayscale partial frames in which a first grayscale data signal having a first grayscale is supplied; and
- a plurality of second grayscale partial frames in which a second grayscale data signal having a second grayscale different from the first grayscale is supplied.

8. The display device of claim 7, wherein the plurality of first grayscale partial frames and the plurality of second grayscale partial frames are arranged alternately with each other.

9. The display device of claim 7, wherein the plurality of second partial frames further include:
- an intermediate partial frame in which no data signal is supplied from the data driver to the second display area.

10. The display device of claim 9, wherein the scan driver
- activates scan signals applied to the second display area among the plurality of scan signals during the plurality of first grayscale partial frames and the plurality of second grayscale partial frames, and
- deactivates the scan signals applied to the second display area among the plurality of scan signals during the intermediate partial frame.

11. The display device of claim 2, wherein the non-fixed data signal is a data signal identical to an image data signal applied to the first display area.

12. The display device of claim 2, wherein the first partial frame includes:
- a start partial frame which is an initial partial frame in the second mode; and
- a last partial frame which is a last partial frame in the second mode.

13. The display device of claim 2, wherein the first partial frame is a start partial frame which is an initial partial frame in the second mode.

14. The display device of claim 2, wherein the light emitting driver includes:

a plurality of stages which outputs the plurality of emission control signals, respectively; and a carry circuit connected to a (k−1)-th stage among the plurality of stages, wherein the carry circuit outputs a carry signal, wherein the carry circuit supplies the carry signal to a k-th stage among the plurality of stages, and wherein k is an integer that is not less than 2.

15. The display device of claim 14, wherein the carry circuit receives a masking enable signal, and wherein the masking enable signal has a first level in the first mode and the first partial frame and has a second level different from the first level during the plurality of second partial frames in the second mode.

16. The display device of claim 15, wherein the first level is identical to a level of an activation period of each of the plurality of emission control signals, and wherein the second level is identical to a level of a deactivation period of each of the plurality of emission control signals.

17. The display device of claim 15, wherein the first partial frame or each of the plurality of second partial frames includes:

an active period;

a front porch period preceding the active period; and a back porch period following the active period, and wherein a level of the masking enable signal is changed during the front porch period or the back porch period.

18. The display device of claim 15, wherein the masking enable signal is changed from the first level to the second level in synchronization with a point in time when a (k−1)-th emission control signal output from the (k−1)-th stage among the plurality of stages is deactivated, during a start partial frame, which is an initial partial frame from among the plurality of second partial frames, and is changed from the second level to the first level in synchronization with a point in time when the (k−1)-th emission control signal output from the (k−1)-th stage among the plurality of stages is activated, during a last partial frame, which is a last partial frame from among the plurality of second partial frames.

19. A display device comprising:

a display panel including a first display area, a second display area and a plurality of pixel disposed in the first and second display areas;

a data driver which outputs a plurality of data signals to the display panel;

a scan driver which outputs a plurality of scan signals to the display panel; and a light emitting driver which outputs a plurality of emission control signals to the display panel, wherein the display panel displays a first image on the first display area and the second display area in a first mode, and displays a second image on the first display area in a second mode, and wherein each of the pixels includes:

a light-emitting element including a cathode and an anode;

a first transistor connected between a power line and the anode of the light-emitting element;

a second transistor which is connected between a data line and a first electrode of the first transistor and receives one of the plurality of scan signals; and an emission control transistor which is connected between the power line and the first electrode of the first transistor and receives one of the plurality of emission control signals, wherein the light emitting driver activates the plurality of emission control signals applied to the first display area and the second display area in the first mode, maintains an emission control signal applied to the emission control transistor of the second display area among the plurality of emission control signals in a deactivation state during at least one partial frame in the second mode.

20. A display device comprising:

a display panel including a first display area, a second display area and a plurality of pixel disposed in the first and second display areas;

a data driver which outputs a plurality of data signals to the display panel;

a scan driver which outputs a plurality of scan signals to the display panel; and a light emitting driver which outputs a plurality of emission control signals to the display panel, wherein the display panel displays a first image on the first display area and the second display area in a first mode, and displays a second image on the first display area in a second mode, and wherein each of the pixels includes:

a light-emitting element including a cathode and an anode;

a first transistor connected between a power line and the anode of the light-emitting element;

a second transistor which is connected between a data line and a first electrode of the first transistor and receives one of the plurality of scan signals; and an emission control transistor which is connected between the anode of the light-emitting element and the first transistor and receives one of the plurality of emission control signals, wherein the light emitting driver activates the plurality of emission control signals applied to the first display area and the second display area in the first mode, maintains an emission control signal applied to the emission control transistor of the second display area among the plurality of emission control signals in a deactivation state during at least one partial frame in the second mode.

* * * * *